(12) United States Patent
Agrawal et al.

(10) Patent No.: US 11,182,937 B1
(45) Date of Patent: Nov. 23, 2021

(54) COHESIVE MANIPULATION OF BEZIER HANDLES

(71) Applicant: Adobe Inc., San Jose, CA (US)

(72) Inventors: Vivek Agrawal, Uttar Pradesh (IN); Tushita Aggarwal, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/923,402

(22) Filed: Jul. 8, 2020

(51) Int. Cl.
  *G06T 11/20* (2006.01)
  *G06F 3/0484* (2013.01)

(52) U.S. Cl.
  CPC ........ *G06T 11/203* (2013.01); *G06F 3/04845* (2013.01); *G06T 2200/24* (2013.01)

(58) Field of Classification Search
  None
  See application file for complete search history.

(56) References Cited

U.S. PATENT DOCUMENTS

2017/0262163 A1* 9/2017 Nimura ............. G06K 9/3275

* cited by examiner

*Primary Examiner* — Jeffrey J Chow
(74) *Attorney, Agent, or Firm* — Shook, Hardy & Bacon L.L.P.

(57) ABSTRACT

The technology described herein is directed to a Bezier manipulation tool that facilitates a handle-movement paradigm for cohesive manipulation of a selected group of Bezier handles. In some implementations, the Bezier manipulation tool manipulates a selected group of Bezier handles by collectively selecting and synchronously (or concurrently) manipulating multiple handles. For example, when the Bezier manipulation tool detects a user-initiated manipulation of a reference handle of a selected group of Bezier handles, angular and radial length movements of the reference handle occurring as a result of the user-initiated manipulation are calculated relative to an anchor point associated with the reference handle. The Bezier manipulation tool cohesively manipulates other Bezier handles of the selected group of Bezier handles in accordance with the angular and radial length movements of the reference handle, e.g. {delta-theta, delta-r}, concurrent with the user-initiated manipulation of the reference handle.

20 Claims, 18 Drawing Sheets

COHESIVE MANIPULATION OF BEZIER HANDLES

TECHNICAL FIELD

Aspects of the disclosure are related to the field of digital illustration or graphics editing, and in particular, to a Bezier manipulation tool that facilitates cohesive (or concurrent) manipulation of multiple Bezier handles.

BACKGROUND

A digital illustration or graphics editing program (also referred to as a vector drawing application) is a computer program such as, for example, Adobe Illustrator® or AdobeXD®, that allows a user to compose and edit vector graphics images interactively on a computer and save the images in a vector graphics format, such as, for example, EPS, PDF, WMF, SVG, VML, etc. Designers frequently use vector drawing applications to create and edit content, produce artwork and visual designs, generate user interface designs (UX) and web documents, and otherwise author work product.

In connection with the content creation and editing processes, a designer (or user) can employ various creation or manipulation tools provided by the vector drawing application. For example, a toolbar or menu of available operations may be exposed in connection with the vector drawing application. The options made available via the vector drawing application may include various creation tools, e.g. pen tool, curvature tool, pencil tool, etc., operable to draw shapes, lines, or arcs, and thereby allow the designer to create paths. The options also include various manipulation tools, e.g. pen tool, direct selection tool, anchor tool, etc., operable to edit the curvature of the paths by moving or rotating Bezier handles.

Bezier curves are mathematical formulas for defining curved lines and form the basis for nearly all vector drawing programs. Indeed, in vector drawing applications, a path is typically represented by multiple Bezier curves cascaded one after the other. The Bezier curves typically employ at least three points: two endpoints called anchor points and at least one additional point called a Bezier handle. The anchor points define the span of a line segment of the path and the Bezier handle controls the bend of the curve or the curvature of the path.

A designer (or user) can create a path using a creation tool and subsequently adjust each Bezier handle to achieve a desired curvature. In connection with the content creation and editing processes, there are many scenarios where multiple Bezier handles of a path or design need to be adjusted, e.g. to increase the height of a sinusoidal curve, to change multiple parallel curvatures while maintaining the parallelism, to uniformly change the size of petals of a flower in each direction, etc. Current vector applications do not provide a way to edit or move multiple Bezier-handles together. That is, only a single Bezier handle can be selected and manipulated by a designer at any given time. Unfortunately, adjusting each Bezier handle of a path individually (e.g., in sequence or series) to achieve the desired curvature is a tedious job.

SUMMARY

One or more embodiments described herein, among other benefits, solve one or more of the foregoing or other problems in the art by providing systems, methods, and non-transitory computer readable media for cohesive (or collective) manipulation of Bezier handles. In some implementations, the technology described herein is directed to a Bezier manipulation tool that manipulates a selected group of multiple Bezier handles by collectively selecting and synchronously (or concurrently) manipulating the multiple Bezier handles. More specifically, when the Bezier manipulation tool detects a user-initiated manipulation of a reference handle of the selected group of Bezier handles, angular and radial length movements of the reference handle occurring as a result of the user-initiated manipulation are calculated relative to an anchor point associated with the reference handle. The Bezier manipulation tool then cohesively manipulates other Bezier handles of the selected group of Bezier handles in accordance with the angular and radial length movements of the reference handle, e.g. {delta-theta, delta-r}, concurrently (or simultaneously) with the user-initiated manipulation of the reference handle.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

Figure 1A:
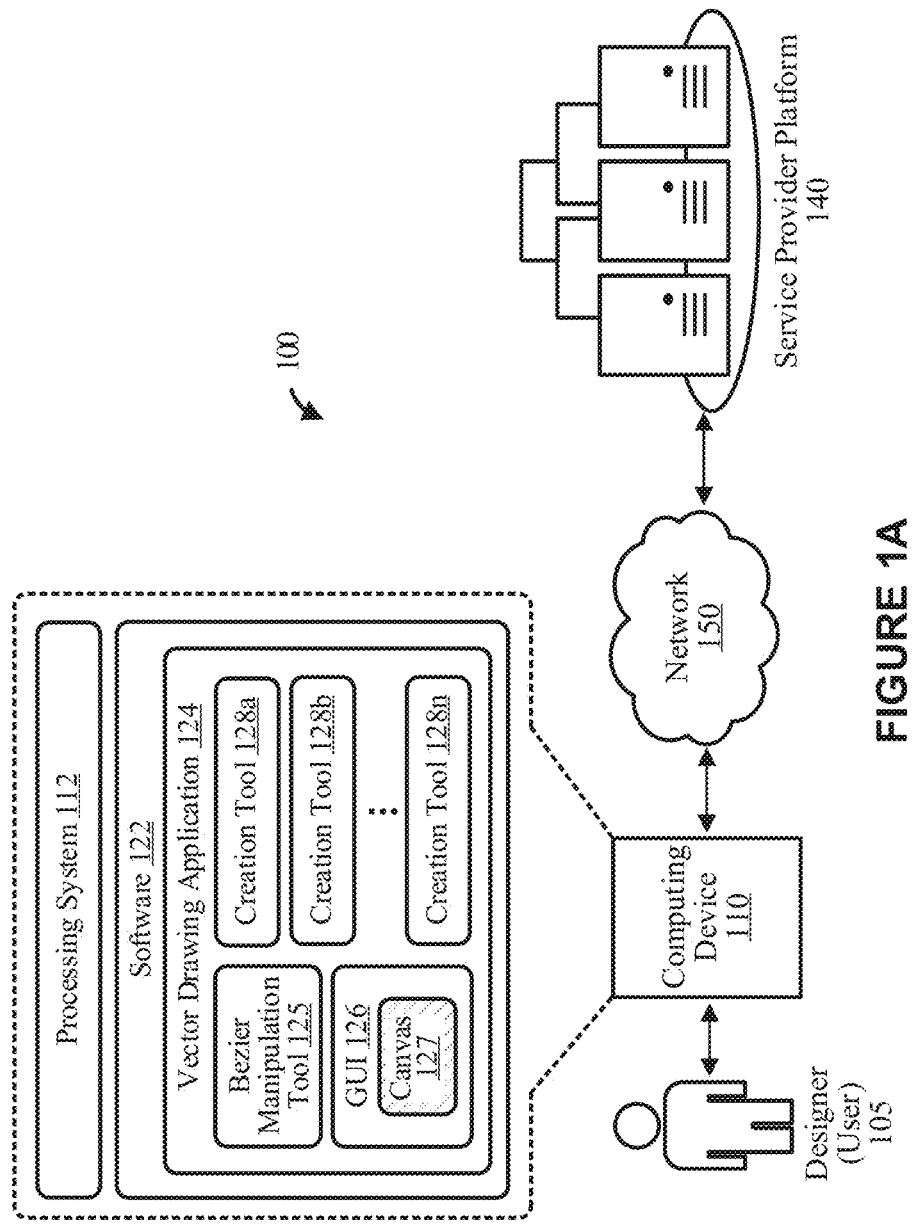
FIG. 1A depicts a block diagram illustrating an example Bezier handle manipulation framework for cohesive (or concurrent) manipulation of multiple Bezier handles, according to some implementations.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include machine-implemented methods, computing devices, or computer readable medium.

Vector drawing applications typically provide manipulation tools for editing curvature of paths by moving or rotating Bezier handles. In connection with the content editing process, there are many scenarios where multiple Bezier handles need to be adjusted synchronously (or concurrently), e.g. to increase the height of a sinusoidal curve, to change multiple parallel curvatures while maintaining the parallelism, to uniformly change the size of petals of a flower in each direction, etc. As noted above, it is a tedious job for designers (or users) to have to adjust each Bezier handle of a path individually to achieve the desired curvature. Moreover, adjusting each Bezier handle individually often results in various inaccuracies as most designers are unable to maintain parallelism within a degree of accuracy while adjusting the parallel curvatures. Unfortunately, current vector applications do not provide a way to collectively select and/or manipulate, e.g. edit or move, multiple Bezier-handles concurrently.

Additionally, even if designers (or users) were able to collectively select multiple Bezier handles, it is not clear how the handles can be concurrently manipulated in a manner that affects a vector design positively based on a user-initiated manipulation of a single Bezier handle of a selected group of handles. For example, a straightforward translation technique can be used to concurrently move or manipulate multiple Bezier handles via a single selected Bezier handle (or reference Bezier handle). The straightforward translation technique may involve applying the same delta translations (or drag movement), e.g. {delta-X, delta-Y}, relative to a canvas to each of the selected handles. Unfortunately, this technique tends to affect the vector design negatively, e.g. by distorting the shape under manipulation in a negative or undesired way.

The technology described herein is directed to a Bezier manipulation tool that facilitates a handle-movement paradigm for cohesive manipulation of a selected group of multiple Bezier handles. Indeed, the Bezier manipulation tool manipulates the selected group of multiple Bezier handles by collectively selecting and synchronously (or concurrently) manipulating the multiple handles. In some implementations, when the Bezier manipulation tool detects a user-initiated manipulation of a reference handle of a selected group of Bezier handles, angular and radial length movements of the reference handle are calculated relative to an anchor point associated with the reference handle occurring as a result of the manipulation. The Bezier manipulation tool then cohesively manipulates other Bezier handles of the selected group of Bezier handles in accordance with the angular and radial length movements of the reference handle, e.g. {delta-theta, delta-r}, concurrent with the user-initiated manipulation of the reference handle.

In some implementations, the angular movement of the reference handle delta-theta is directly applied to other Bezier handles of the selected group of Bezier handles, e.g. the angle that the reference Bezier handle is moved is determined and applied to each of the other Bezier handles under manipulation. However, the radial length movement of the reference handle {delta-r} is not directly applied to other Bezier handles of the selected group of Bezier handles. Rather, the Bezier manipulation tool calculates a percentage change in radial length movement of the reference Bezier handle and applies the percentage change to other Bezier handles of the selected group of Bezier handles while maintaining their smoothness.

Various technical effects are enabled by the techniques discussed herein. Among other benefits, the Bezier manipulation tool facilitates a handle-movement paradigm that results in increased workflow efficiency and improved Bezier handle precision. Indeed, the Bezier manipulation tool facilitates increased workflow efficiency as cohesive Bezier handle manipulation reduces the hassle and the time required to sequentially (or individually) edit multiple Bezier handles and, thus, increases efficiency of the overall workflow. Additionally, improved Bezier manipulation precision is attainable via the discussed handle-movement paradigm which makes it easier to maintain same-level handle positions, parallelism, and angular symmetry amongst Bezier handles during manipulation—even in the absence of snapping amongst the Bezier handles. Furthermore, the Bezier manipulation tool described herein also simplifies the ability to create complex path effects. Indeed, the handle-movement paradigm enables a user to more quickly create and manipulate complex path effects. For example, in a few simple handle movements, a designer (or user) can manipulate multiple Bezier handles concurrently to create any multitude of variations that were previously much more difficult—if not impossible—for most designers (or users) to achieve.

As used herein, the term "vector drawing application" refers to a computer program such as, for example, Adobe Illustrator® or AdobeXD®, that allows a user to compose and edit vector graphics images interactively on a computer and save the images in a vector graphics format, such as, for example, EPS, PDF, WMF, SVG, VML, etc. Designers frequently use vector drawing applications to create and edit content, produce artwork and visual designs, generate user interface designs (UX) and web documents, and otherwise author work product. Vector drawing applications also provide manipulation tools, e.g. pen tool, direct selection tool, anchor tool, etc., to edit the curvature of the paths by moving or rotating Bezier handles. That is, a designer (or user) can create a path using a creation tool and subsequently adjust each Bezier handle to achieve a desired curvature.

As used herein, the term "Bezier curve" refers to a mathematical formula for defining a curved line. As discussed above, Bezier curves form the basis for nearly all vector drawing programs and employ at least three points: two endpoints called anchor points, and at least one additional point called a Bezier handle. The anchor points define the span of a line segment and the Bezier handle controls the bend of the curve or the curvature of the line.

As used herein, the term "path" refers to multiple Bezier curves cascaded one after the other sequentially within a vector drawing application. For example, multiple Bezier curves can be connected within a vector drawing application to form a path.

As used herein, the term "cohesive manipulation" refers to the process of automatically manipulating multiple selected Bezier curves concurrently in accordance with a detected movement of another one of the multiple selected Bezier curves. The term concurrently means that the multiple selected Bezier curves all appear to be manipulated simultaneously (in real-time or near real) within a vector drawing application. The movement of the one Bezier curve of the multiple selected Bezier curves can occur as a result of a user-initiated manipulation of the one Bezier curve within a vector drawing application. For example, responsive to user-initiated manipulation (or movement) of one Bezier curve of a group of multiple selected Bezier curves, the Bezier manipulation tool automatically manipulates other Bezier curves of the group of selected Bezier curves concurrently with the user-initiated manipulation of the one Bezier curve.

As used herein, the term "reference handle" refers to a Bezier handle associated with the one manipulated Bezier curve (or reference curve) of a group of multiple selected Bezier curves. As noted above, each Bezier curve has a corresponding Bezier handle that controls bend or curvature of that Bezier curve. Furthermore, "cohesive manipulation" refers to the process of automatically manipulating multiple selected Bezier curves concurrently in accordance with a detected movement of one of the multiple selected Bezier curves. The Bezier curve associated with the detected movement, e.g., the user-initiated movement, is the reference curve and Bezier handle corresponding to the reference curve is the reference handle.

As used herein, the term "target handle" refers a Bezier handle associated with a target Bezier curve. As noted above, "cohesive manipulation" refers to the process of, responsive to a user-initiated manipulation (or movement) of one Bezier curve of a group of multiple selected Bezier curves, automatically manipulating other Bezier curves of the group of selected Bezier curves concurrently with the user-initiated manipulation of the one Bezier curve. Accordingly, the Bezier manipulation tool manipulates each of the other Bezier curves of the group of selected Bezier curves. The target Bezier curve refers an individual Bezier curve being manipulated by the Bezier manipulation tool and the target handle refers to Bezier handle corresponding to the target curve.

As used herein, the term "vector design" refers to the work product or content that is created and/or edited within the vector drawing applications. For example, a designer (or user) can create one or more paths using a creation tool resulting in a vector design and subsequently adjust each Bezier handle concurrently to achieve a desired curvature.

A general overview and architecture of a Bezier handle manipulation framework including a Bezier manipulation tool for cohesive (or concurrent) manipulation of multiple Bezier handles is described in relation to FIG. 1A. An example drawing canvas is described in relation to FIG. 1B and an example path including a Bezier handle which can be manipulated by a designer (or user) to adjust the curvature is described in relation to FIG. 1C. Thereafter, a more detailed description of the handle-movement paradigm and corresponding components and processes of the Bezier manipulation tool are provided in relation to the subsequent figures.

FIG. 1A depicts a block diagram illustrating an example Bezier handle manipulation framework 100 for cohesive (or concurrent) manipulation of multiple Bezier handles, according to some implementations. As shown in the example of FIG. 1A, the Bezier handle manipulation framework 100 includes a Bezier manipulation tool 126 that cohesively (or concurrently) manipulates multiple Bezier handles for increased workflow efficiency and improved Bezier manipulation precision. For example, the Bezier manipulation tool 126 facilitates a handle-movement paradigm which enables a designer (or user) 105 to simultaneously manipulate multiple Bezier handles while maintaining same-level Bezier handle positions, parallelism, and angular symmetry.

As shown in the example of FIG. 1A, the Bezier handle manipulation framework 100 includes a designer 105, a computing device 110, a service provider platform 140, and network 150. The components of the example Bezier handle manipulation framework 100 communicate via the network 150. The network 150 may be any suitable network over which computing devices can communicate. Example networks are discussed in greater detail with reference to FIG. 12. Additional or fewer systems or components are possible.

As discussed herein, the Bezier handle manipulation framework 100 includes computing device 110 associated with designer (or user) 105. The computing device 110 includes (or has stored thereon) processing system 112 and software 122. Software 122 includes a vector drawing application 124. The vector drawing application 124 includes a Bezier manipulation tool 125, a graphical user interface (GUI) 126, and multiple creation (or manipulation) tools 128a-128n. Furthermore, as shown in the example of FIG. 1A, the GUI 126 includes a canvas 127. The creation (or manipulation) tools 128a-128n are tools that are selectable by the designer (or user) 105 within the vector drawing application 125 for creating and/or editing content. More specifically, as discussed herein, the creation (or manipulation) tools 128a-128n are selectable by the designer (or user) 105 to manipulate Bezier handles and thereby achieve a desired curvature.

The Bezier manipulation tool 125 described herein works in conjunction with the creation (or manipulation) tools 128a-128n to facilitate the handle-movement paradigm for cohesive manipulation of a selected group of Bezier handles. For example, once selected, a creation (or manipulation) tool 128 allows the designer (or user) 105 to create or draw a path on a canvas 127 within the vector drawing application 125. A more detailed example is shown and discussed with reference to FIG. 1B. By way of example and not limitation, the creation (or manipulation) tools 128a-128n can include pen tools, curvature tools, pencil tools, etc.

As noted above, in a design world it is a frequent scenario for the designer (or user) 105 to manipulate the path using the creation (or manipulation) tool 128. Indeed, the designer (or user) 105 can adjust the Bezier handles to achieve a desired curvature. The Bezier manipulation tool 125 facilitates the selection of multiple Bezier handles. As discussed herein, the Bezier manipulation tool 125 then allows the designer (or user) 105 to coherently (synchronously and/or concurrently) manipulate the selected group of Bezier handles in accordance with angular and radial length movements of a reference handle, e.g. {delta-theta, delta-r}, concurrent with a user-initiated manipulation of the reference handle.

Figure 12:
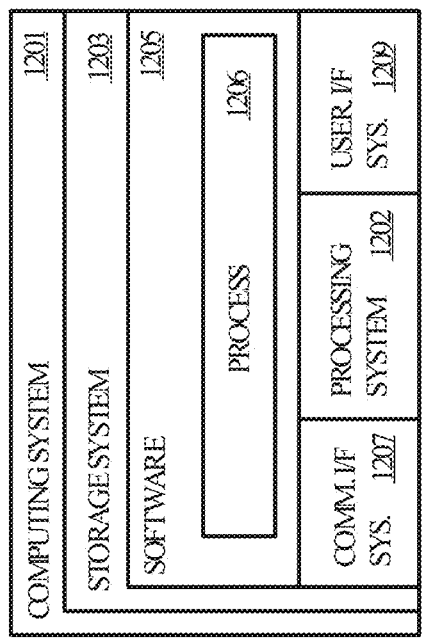
FIG. 12 depicts a block diagram illustrating an example computing system suitable for implementing the technology disclosed herein, including any of the applications, architectures, elements, processes, and operational scenarios and sequences illustrated in the Figures and discussed below in the Technical Disclosure.

The computing device 110 can be one of a variety of computing devices, including a smartphone, desktop computer, laptop computer, or other computing device including combinations or variations thereof of which computing system 1201 of FIG. 12 is representative. Furthermore, although FIG. 1A depicts a single computing device 110, in some implementations the Bezier handle manipulation framework environment 100 can include multiple different designers (users), each associated with one or more different computing devices.

The service provider platform 140 is representative of any system or collection of systems that is configured to maintain and provide access to resources, services, and content. More specifically, the service provider platform 140 is configured to communicate with computing device 110 over network 150 to provide a "cloud-based" computing environment. As discussed herein, the service provider platform 140 is configured to make various resources available over the network 150 to clients. In some scenarios, users may sign-up for accounts that are employed to access corresponding resources from a provider. The service provider may authenticate credentials of a user (e.g. username and password) before granting access to an account and corresponding resources. Other resources may be made freely available, (e.g. without authentication or account-based access). The resources can include any suitable combination of services and/or content typically made available over a network by one or more providers. Some examples of services include, but are not limited to, a digital illustration service, an online suite of applications, photo editing service, a web development and management service, a collaboration service, a social networking service, a messaging service, an advertisement service, etc. Content may include various combinations of text, video, ads, audio, multi-media streams, animations, images, web documents, web pages, applications, device applications, etc.

The service provider platform 140 may include server computers, blade servers, rack servers, and any other type of computing system (or collection thereof) suitable for facilitating the handle-movement paradigm for cohesive manipulation of a selected group of Bezier handles as discussed herein. Such systems may employ one or more virtual machines, containers, or any other type of virtual computing resource in the context of maintaining and providing access to resources, services, and content of which computing system 1201 of FIG. 12 is representative.

Figure 1B:
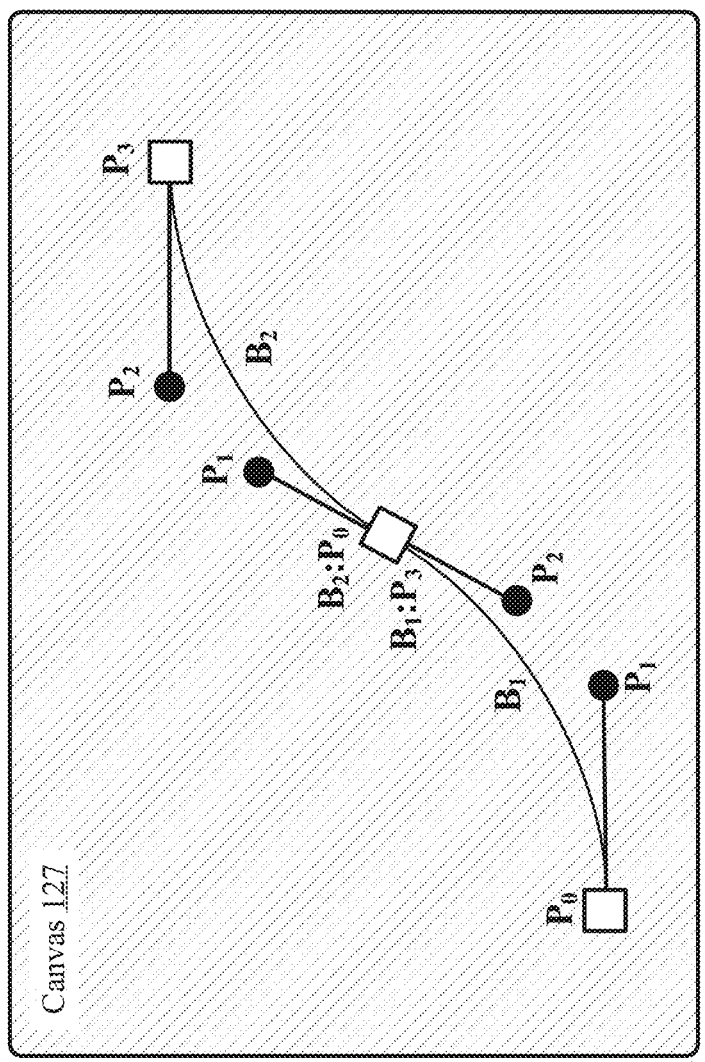
FIG. 1B depicts a more detailed example including various parts on drawing canvas of a vector drawing application, according to some implementations.

Referring next to FIG. 1B, a more detailed example of drawing canvas 127 is shown illustrating various parts on drawing canvas 127 of the vector drawing application 124, according to some implementations. More specifically, the example of FIG. 1B depicts the parts on the drawing canvas 127 including a path (or line segment) represented by two cascaded Bezier curves $B_1$ and $B_2$. The two cascaded Bezier curves $B_1$ and $B_2$ include anchor points (or endpoints) $P_0$ and $P_3$ that define the span of the path and through which the path passes. As discussed herein, Bezier handles $P_1$ and $P_2$ control the bend of the curve or the curvature of the path when manipulated by a designer (or user).

The user workflow discussed herein describes a process by which the designer (or user) 105 cohesively (or concurrently) manipulates (or edits) the parts in the vector drawing application 125. As noted above, the part consists of two cascaded Bezier curves $B_1$ and $B_2$ including Bezier handles (or control points) $P_1$ and $P_2$ that control the curvature of the Bezier curves $B_1$ and $B_2$, respectively. As shown in the example of FIG. 1B, the vector drawing application 125 exposes the Bezier handles $P_1$ and $P_2$ to the designer (or user) 105. The user is then allowed to cohesively manipulate these Bezier handles $P_1$ and $P_2$ as discussed herein. For example, a designer (or user) 105 can manipulate the Bezier curves $B_1$ and $B_2$ by adjusting the Bezier handles $P_1$ and $P_2$ using an input or user interface system of the computing device 110 such as, for example, a keyboard, a cursor control device (e.g. a mouse), a microphone, a scanner, touch functionality (e.g. capacitive or other sensors that are configured to detect physical touch), a camera (e.g. which may employ visible or non-visible wavelengths such as infrared frequencies to recognize movement as gestures that do not involve touch), and so forth.

Figure 1C:
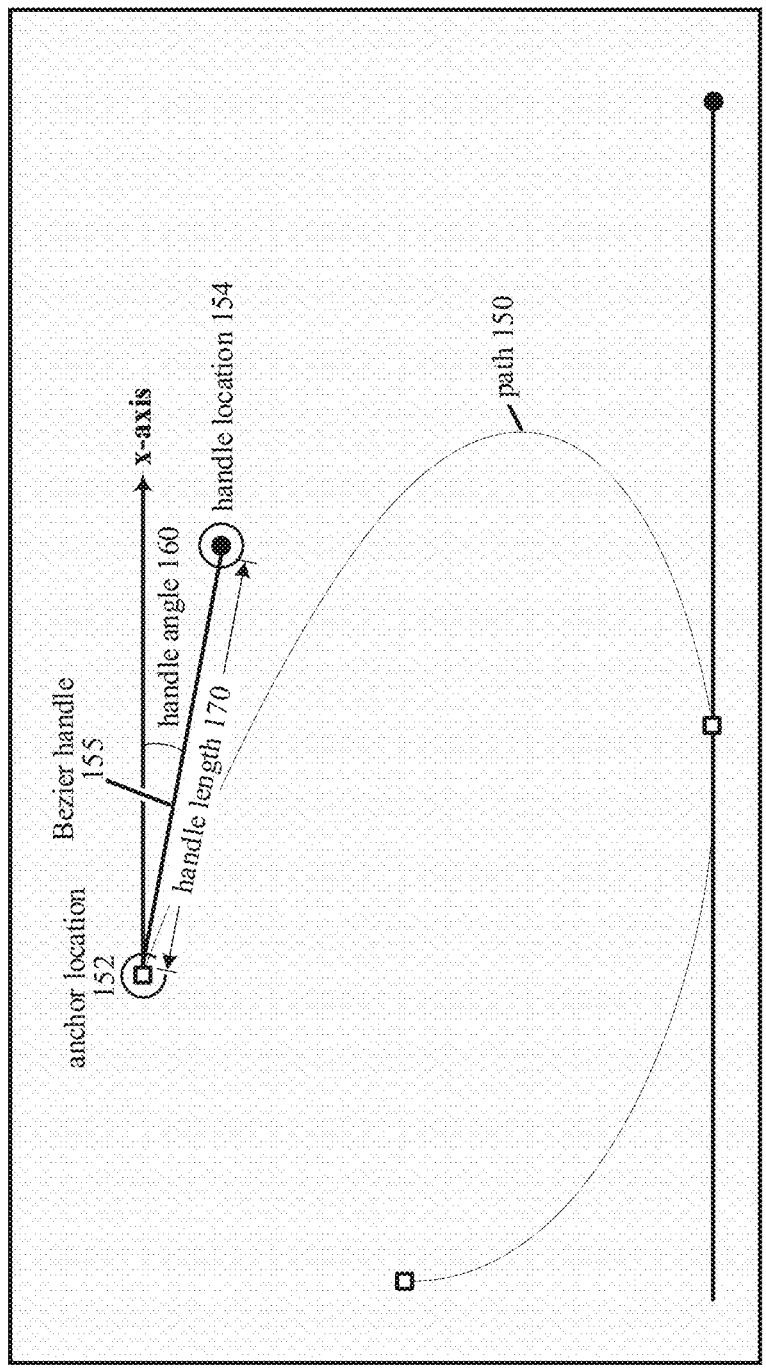
FIG. 1C depicts an example path including a Bezier handle which can be manipulated by a designer (or user) to adjust the curvature of the path, according to some implementations.

FIG. 1C depicts an example path 150 including a Bezier handle 155 which can be manipulated by a designer (or user) to adjust the curvature of the path, according to some implementations. More specifically, the example of FIG. 1C illustrates a Bezier handle 155 having a handle angle 160 and a handle length 170 that can be manipulated by a designer (or user) relative to an associated anchor point (or location) 152. As discussed herein, when a designer moves the Bezier handle 150 to adjust the curvature of path 150, there are two key positional aspects of handle which play significant role: (1) the angular position relative to the associated anchor 152 (or handle angle 160), and (2) the distance from the handle anchor 152 to the handle location 154 (or the handle length 170). As shown in the example of FIG. 1C, the handle angle 160 is manipulated about an x-axis relative to the associated anchor point (or location) 152 to determine the handle angle 160. The handle length 170 is defined as the span or length between anchor location 152 and handle location 154.

Figure 2:
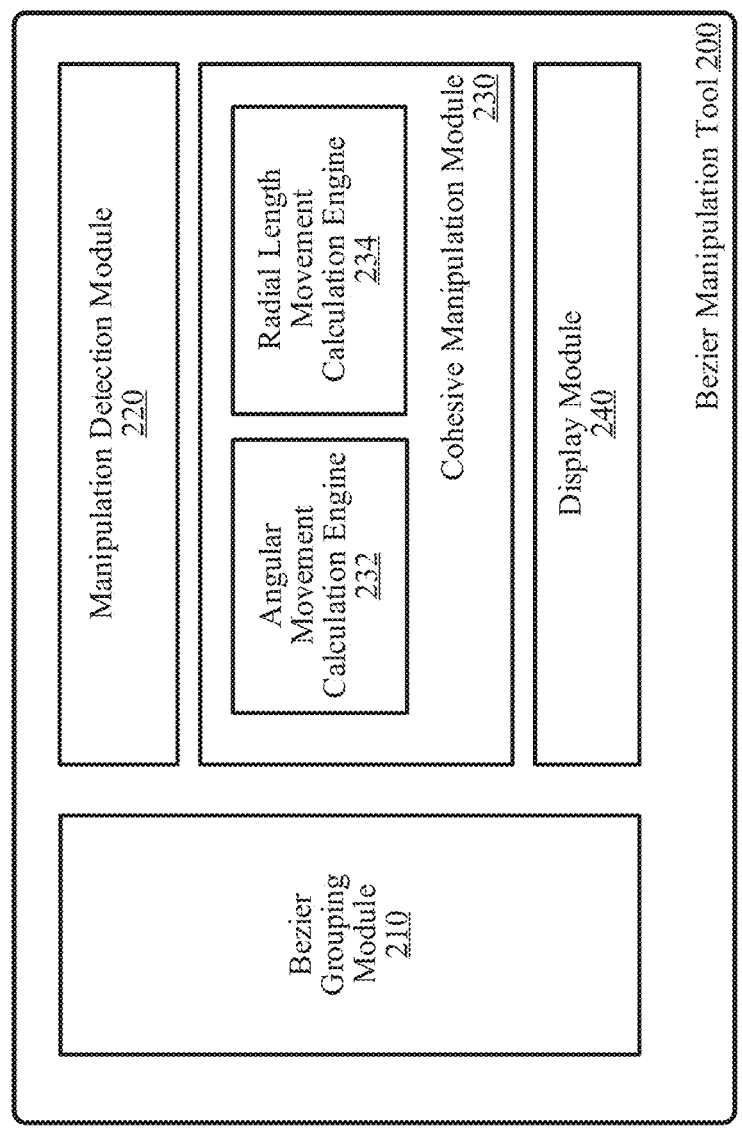
FIG. 2 depicts a block diagram illustrating example components of a Bezier manipulation tool that facilitates cohesive (or concurrent) manipulation of multiple Bezier handles, according to some implementations.

FIG. 2 depicts a block diagram illustrating example components of a Bezier manipulation tool 200 that facilitates cohesive (or concurrent) manipulation of multiple Bezier handles, according to some implementations. The example Bezier manipulation tool 200 can be Bezier manipulation tool 125 of FIG. 1, although alternative configurations are possible. The functions represented by the components, modules, managers and/or engines described with reference to FIG. 2 can be implemented individually or in any combination thereof, partially or wholly, in hardware, software, or a combination of hardware and software.

Although illustrated as discrete components, the operation and functionality of the components, modules, managers and/or engines described with reference to FIG. 2 can be, partially or wholly, integrated within other components of the vector drawing application 124. For example, one or more components of the manipulation tool 200 can include or be executed on any system or collection of systems configured to perform the actions discussed herein. The system or collection of systems may include server computers, blade servers, rack servers, and any other type of computing system (or collection thereof) suitable for facilitating the handle-movement paradigm for cohesive manipulation of a selected group of Bezier handles as discussed herein.

As illustrated in the example of FIG. 2, the Bezier manipulation tool 200 includes a Bezier grouping module 210, a manipulation detection module 220, a cohesive manipulation module 230 and a display module 240. The cohesive manipulation module 230 includes an angular calculation movement engine 232 and a radial length movement calculation engine 234. Other components or modules are also possible. The modules are discussed in greater detail below.

The Bezier grouping module 210 is configured to facilitate concurrent selection of a group of multiple Bezier handles. As noted above, current vector applications do not provide a way to select multiple Bezier handles together. That is, only a single Bezier handle can be selected on a canvas by a designer (or user) at any given time. For example, in current vector applications such as, for example, AdobeXD®, Bezier handles are only visible to the designer (or user) on the canvas when a single Bezier handle is selected. The Bezier grouping module 210 allows the designer (or user) to concurrently select (and make visible) multiple Bezier handles on the canvas for subsequent manipulation.

The manipulation detection module 220 is configured to detect a user-initiated manipulation of a reference Bezier handle belonging to the selected group of multiple Bezier handles. Indeed, once the group of multiple Bezier handles is selected, the manipulation detection module 220 monitors user input to detect user manipulation (or movement) of one Bezier handle, e.g. the reference Bezier handle, of the group of multiple Bezier handles.

The cohesive manipulation module 230 is configured to, responsive to detection of the user-initiated manipulation of the reference Bezier handle, cohesively manipulate other Bezier handles of the group of multiple Bezier handles (e.g. the group of multiple Bezier handles other than the reference Bezier handle) concurrently with the manipulation of the reference Bezier handle by the designer (or user). More specifically, the group of multiple Bezier handles are cohesively manipulated in accordance with angular and radial length movements of the reference Bezier handle. For example, responsive to the user-initiated manipulation of the reference Bezier handle, the cohesive manipulation module 230 calculates angular movement and radial length movement of the reference handle occurring as a result of the manipulation of the reference handle relative to an anchor point associated with the reference handle.

As noted above, the cohesive manipulation module 230 includes the angular calculation movement engine 232 and the radial length movement calculation engine 234. The angular calculation movement engine 232 is configured to calculate the angular movement of the reference Bezier handle occurring as a result of the user-initiated manipulation. More specifically, the angular calculation movement engine 232 identifies the anchor point associated with the reference handle and calculates a change in an angle that the reference handle is rotated relative to the anchor point associated with the reference handle as a result of the user-initiated manipulation.

The radial length movement calculation engine 234 is configured to calculate the radial length movement of the reference handle occurring as a result of the manipulation. More specifically, the radial length movement calculation engine 234 calculates a change in a length of the reference handle by determining an initial length of the reference handle, determining a new length of the reference handle occurring as a result of the user-initiated manipulation, and computing the change in the length that the reference handle. The change in the length that the reference handle comprises a difference between the initial length of the reference handle and the new length of the reference handle.

As noted above, the cohesive manipulation module 230 cohesively manipulates other Bezier handles of the group of multiple Bezier handles (e.g. the group of multiple Bezier handles other than the reference Bezier handle) concurrently with the manipulation of the reference Bezier handle (which is being manipulated by the designer (or user) of the group of multiple Bezier handles) in accordance with the angular and radial length movements of the reference handle. The operation and functionality of the cohesive manipulation module 230 is shown and discussed in greater detail with reference to FIG. 7.

The display module 240 is configured to present an updated drawing path including the manipulated group of Bezier handles on a drawing canvas. For example, the display module 240 determines new Cartesian coordinates for each target handle based on the corresponding new length and new angle. The display module 240 then updates a graphical user interface and displays or directs a computing device to present the graphical user interface including the updated drawing path illustrating the manipulated group of Bezier handles on a drawing canvas.

One or more components of the Bezier manipulation tool 200 can include or be executed on any system or collection of systems configured to perform the actions discussed herein. The system or collection of systems may include server computers, blade servers, rack servers, and any other type of computing system (or collection thereof) suitable for cohesive (or concurrent) manipulation of multiple Bezier handles and/or otherwise carrying out the operations discussed herein. Such systems may employ one or more virtual machines, containers, or any other type of virtual computing resource in the context of improving application performance orchestration on a platform of which computing system 1201 of FIG. 12 is representative.

Figure 3:
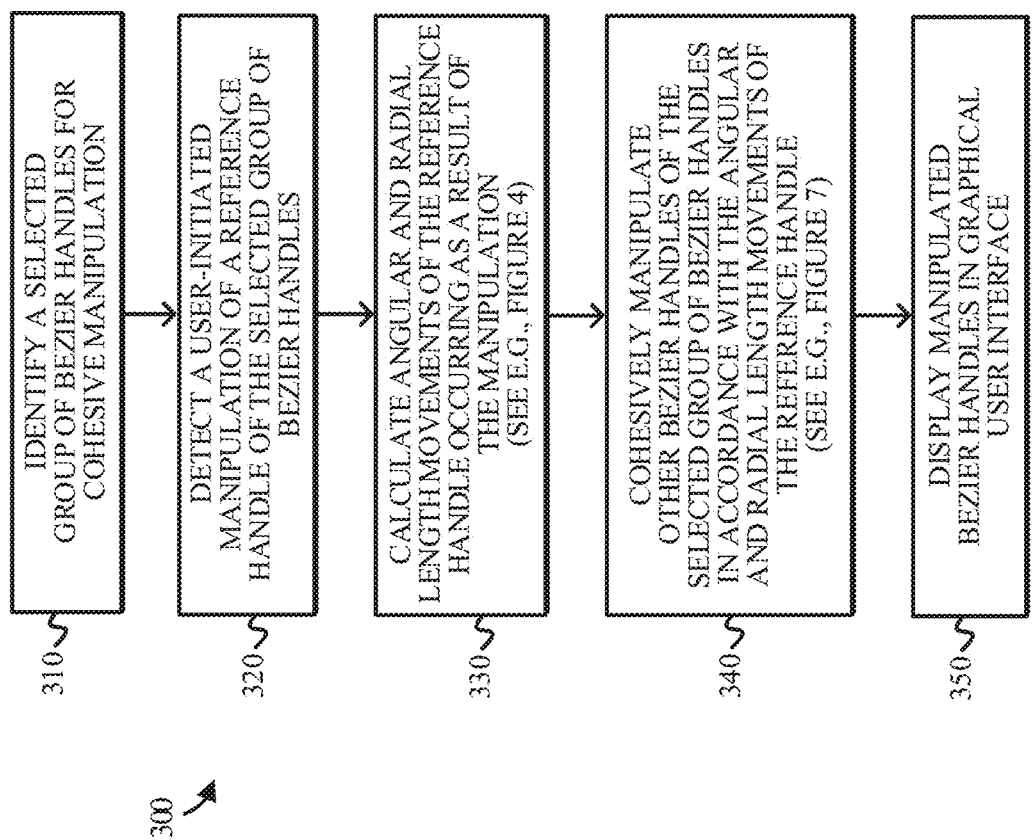
FIG. 3 depicts a flow diagram illustrating an example Bezier manipulation process for cohesively (or concurrently) manipulating multiple Bezier handles, according to some implementations.

FIG. 3 depicts a flow diagram illustrating an example Bezier manipulation process 300 for cohesively (or concurrently) manipulating multiple Bezier handles, according to some implementations. The example Bezier manipulation process 300 may be performed in various implementations by a Bezier manipulation tool such as, for example, Bezier manipulation tool 125 of FIG. 1A, Bezier manipulation tool 200 of FIG. 2, or one or more processors, modules, engines, or components associated therewith.

To begin, at 310, the Bezier manipulation tool identifies a selected group of Bezier handles for cohesive manipulation. In some implementations, to identify the selected group of Bezier handles, the Bezier manipulation tool receives a first user input identifying a drawing path in a drawing canvas and a second user input identifying multiple Bezier handles that are part of that path. The Bezier manipulation tool then responsively groups the multiple Bezier handles resulting in the selected group of Bezier handles.

At 320, the Bezier manipulation tool detects a user-initiated manipulation of a reference handle of the selected group of Bezier handles. At 330, the Bezier manipulation tool calculates angular and radial length movements of the reference handle occurring as a result of the manipulation. An example of the angular and radial length movement calculations is shown and discussed in greater detail with reference to FIG. 4.

At 340, the Bezier manipulation tool cohesively manipulates other Bezier handles of the selected group of Bezier handles in accordance with the angular and radial length movements of the reference handle. An example of the cohesive manipulation of the other Bezier handles of the selected group of Bezier handles in accordance with the angular and the radial length movements of the reference handle is shown and discussed in greater detail with reference to FIG. 7.

Lastly, at 350, the Bezier manipulation tool displays manipulated Bezier handles in a graphical user interface. For example, the Bezier manipulation tool determines new Cartesian coordinates for each target handle based on a corresponding new length and new angle and display (or direct a display device to display) an updated drawing path including the manipulated group of Bezier handles on a drawing canvas in a graphical user interface.

Figure 4:
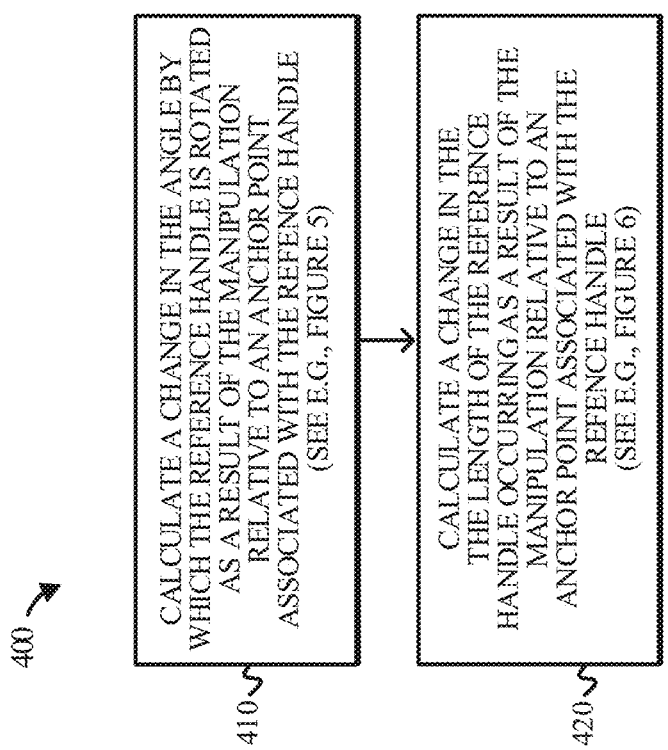
FIG. 4 depicts a flow diagram illustrating an example reference movement calculation process for calculating angular and radial length movements of a reference Bezier handle occurring as a result of a user-initiated manipulation, according to some implementations.

FIG. 4 depicts a flow diagram illustrating an example reference movement calculation process 400 for calculating angular and radial length movements of a reference Bezier handle occurring as a result of a user-initiated manipulation, according to some implementations. The example reference movement calculation process 400 may be performed in various implementations by a Bezier manipulation tool such as, for example, Bezier manipulation tool 125 of FIG. 1A, Bezier manipulation tool 200 of FIG. 2, or one or more processors, modules, engines, or components associated therewith.

To begin, at 410, the Bezier manipulation tool calculates a change in the angle by which the reference handle is rotated as a result of the manipulation relative to an anchor point associated with the reference handle. As part of this process, the Bezier manipulation tool first identifies an anchor point associated with the reference handle and then calculates the change in the angle that the reference handle is rotated relative to the anchor point associated with the reference handle as a result of the user-initiated manipulation. An example illustrating calculation of the change in the angle by which the reference handle is rotated as a result of the manipulation relative to the anchor point is shown and discussed in greater detail with reference to FIG. 5.

At 420, the Bezier manipulation tool calculates a change in the length of the reference handle occurring as a result of the manipulation relative to an anchor point associated with the reference handle. As part of this process, the Bezier manipulation tool first identifies the anchor point associated with the reference handle and then calculates the change in the angle that the reference handle is rotated relative to the anchor point associated with the reference handle as a result of the user-initiated manipulation. An example illustrating calculation of the change in the length of the reference handle occurring as a result of the manipulation relative to the anchor point associated with the reference handle is shown and discussed in greater detail with reference to FIG. 6.

Figure 5:
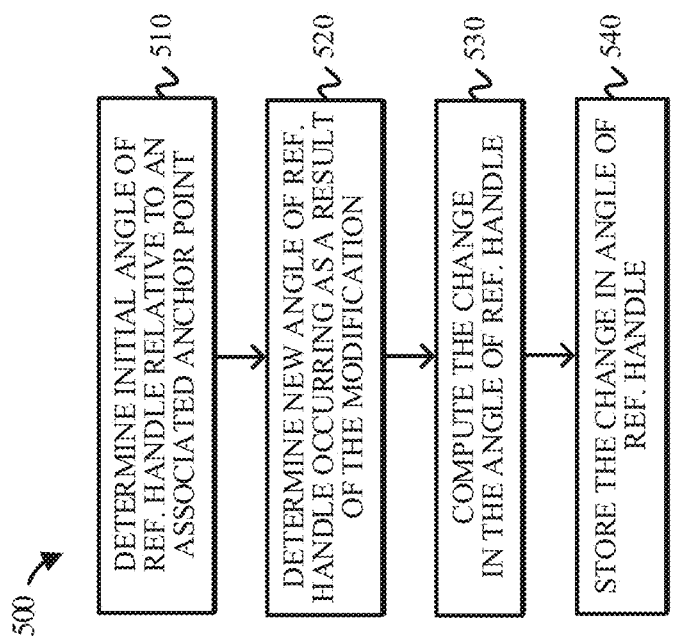
FIG. 5 depicts flow diagrams illustrating an example angle movement calculation process for calculating angular movement of a reference Bezier handle occurring as a result of a user-initiated manipulation, according to some implementations.

FIG. 5 depicts flow diagrams illustrating an example angle movement calculation process 500 for calculating angular movement of a reference Bezier handle occurring as a result of a user-initiated manipulation, according to some implementations. The example angle movement calculation processes 500 may be performed in various implementations by a Bezier manipulation tool such as, for example, Bezier manipulation tool 125 of FIG. 1A, Bezier manipulation tool 200 of FIG. 2, or one or more processors, modules, engines, or components associated therewith.

To begin, at 510, the Bezier manipulation tool determines an initial angle of the reference handle relative to the anchor point associated with the reference handle. More specifically, the initial angle of the reference handle is determined relative to the anchor point and a cartesian reference axis, e.g. x-coordinate axis, relative to the associated anchor point (or anchor location).

At 520, the Bezier manipulation tool determines a new angle that the reference handle is rotated as a result of the user-initiated manipulation. Indeed, the new angle that the reference handle is rotated (or manipulated) about the x-coordinate axis relative to the associated anchor point (or location) is determined or computed.

Lastly, at 530, the Bezier manipulation tool computes the change in the angle that the reference handle is rotated relative to the anchor point associated with the reference handle based on a difference between the initial angle of the reference handle relative to the anchor point and the new angle of the reference handle relative to the anchor point.

Figure 6:
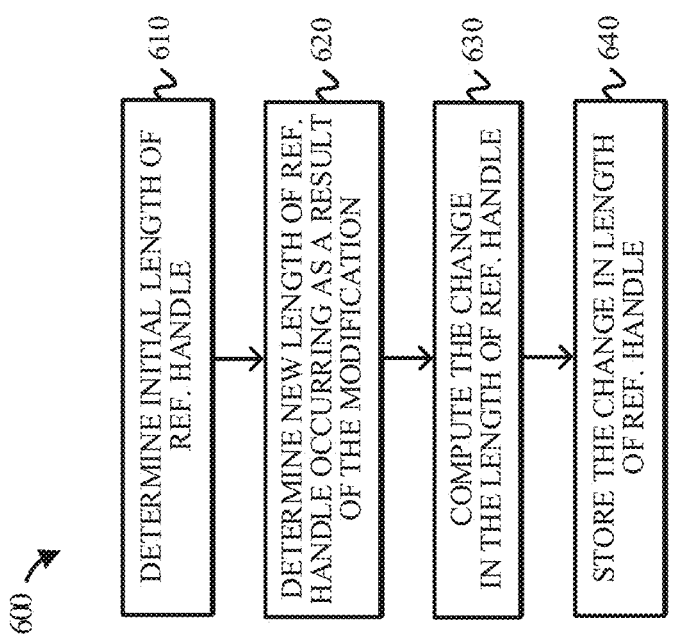
FIG. 6 depicts a flow diagram illustrating an example radial length movement calculation process for calculating radial length movement of a reference Bezier handle occurring as a result of a user-initiated manipulation, according to some implementations.

FIG. 6 depicts a flow diagram illustrating an example radial length movement calculation process 600 for calculating radial length movement of a reference Bezier handle occurring as a result of a user-initiated manipulation, according to some implementations. The example radial length movement calculation process 600 may be performed in various implementations by a Bezier manipulation tool such as, for example, Bezier manipulation tool 125 of FIG. 1A, Bezier manipulation tool 200 of FIG. 2, or one or more processors, modules, engines, or components associated therewith.

To begin, at 610, the Bezier manipulation tool determines an initial length of the reference handle relative to the anchor point associated with the reference handle. More specifically, the initial length of the reference handle is determined by the distance between an anchor location and a Bezier handle location (see, e.g. anchor location 152 and handle location 154 of FIG. 1C).

At 620, the Bezier manipulation tool determines a new length of the reference handle occurring as a result of the user-initiated manipulation. More specifically, the user-initiated manipulation is operable to move the Bezier handle location and the new length of the reference handle is determined by the distance between the anchor location and the new Bezier handle location.

Lastly, at 630, the Bezier manipulation tool computes the change in the length of the reference handle based on a difference between the initial length of the reference handle and the new length of the reference handle.

Figure 7:
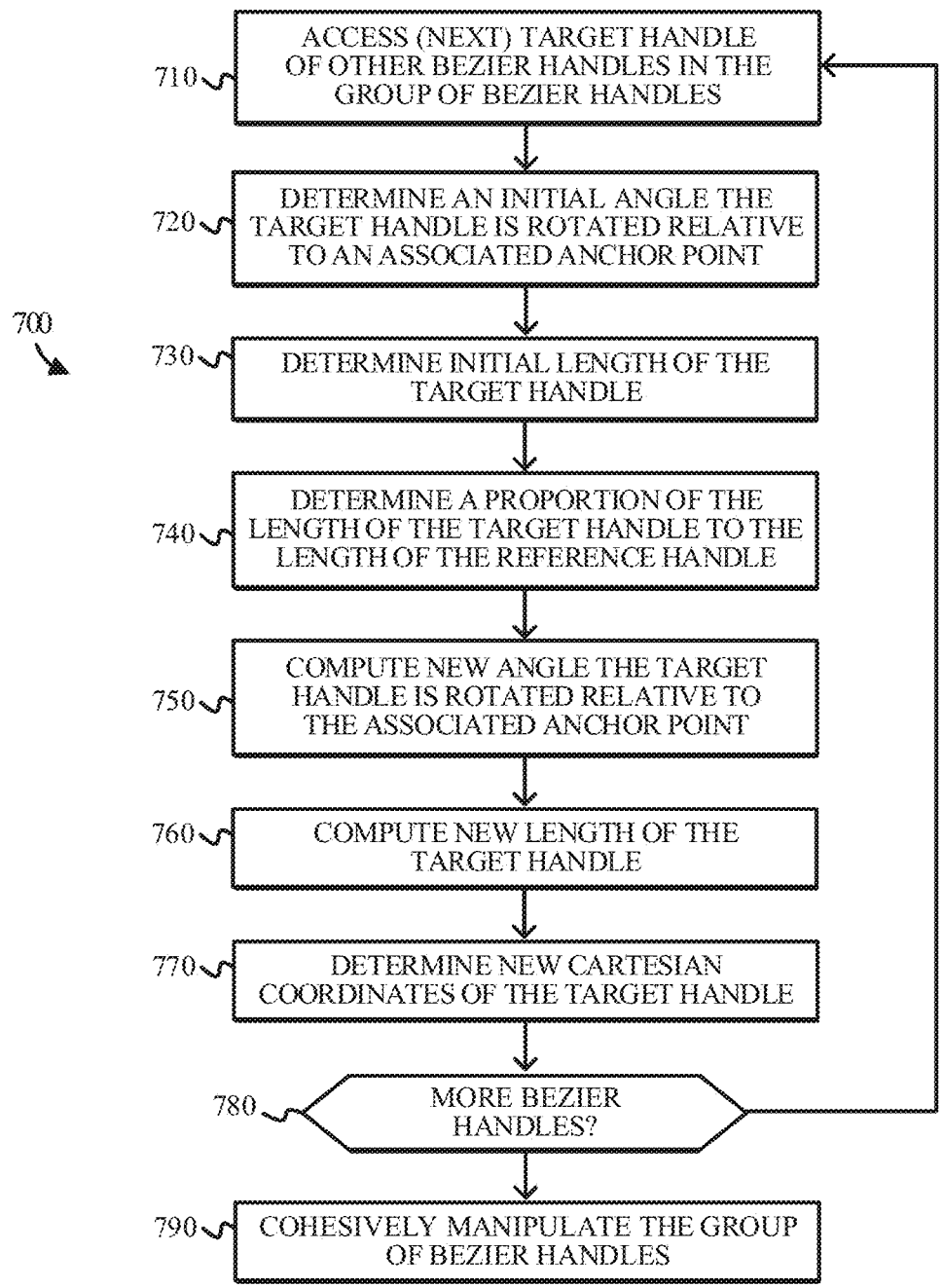
FIG. 7 depicts a flow diagram illustrating an example Bezier manipulation process for cohesively (or concurrently) manipulating multiple Bezier handles, according to some implementations.

FIG. 7 depicts a flow diagram illustrating an example Bezier manipulation process 700 for cohesively (or concurrently) manipulating multiple Bezier handles, according to some implementations. The example Bezier manipulation process 700 may be performed in various implementations by a Bezier manipulation tool such as, for example, Bezier manipulation tool 125 of FIG. 1A, Bezier manipulation tool 200 of FIG. 2, or one or more processors, modules, engines, or components associated therewith.

To begin, at 710, the Bezier manipulation tool accesses a target handle of the group of Bezier handles other than the reference handle and begins the manipulation process. As discussed in more detail below, during the initial iteration, the Bezier manipulation tool accesses any target handle of the group of Bezier handles other than the reference handle. When accessed in subsequent iterations, the target handle is a next unprocessed target handle of the group of Bezier handles other than the reference handle until new cartesian coordinates are determined for each target handle of the group of Bezier handles. Moreover, although not shown at 710, the Bezier manipulation tool also identifies an anchor point associated with the target handle.

At 720, the Bezier manipulation tool determines an initial angle that the target handle (accessed in step 710) is rotated relative to the associated anchor point. For example, the Bezier manipulation tool determines the initial angle of the target handle relative to the anchor point and cartesian reference axis, e.g. x-coordinate axis, relative to the associated anchor point (or anchor location).

At 730, the Bezier manipulation tool determines an initial length of the target handle (accessed in step 710) relative to the associated anchor point. More specifically, the initial length of the target handle is determined as the distance between an anchor location of the target handle and the Bezier handle location (see, e.g. anchor location 152 and handle location 154 of FIG. 1C). Next, at 740, the Bezier manipulation tool determines a proportion of the initial length of the target handle relative to the initial length of the reference handle.

At 750, the Bezier manipulation tool computes a new angle for the target handle. As discussed herein, the new angle is the angle that the target handle will be rotated relative to the target handle's associated anchor point after cohesive manipulation. In some implementations, the Bezier manipulation tool computes the new angle for the target handle by rotating the new angle by the change in the angle that the reference handle is rotated relative to the reference handle's anchor point as a result of the user-initiated manipulation of the reference handle. As discussed above, an example determination of the change in the angle that the reference handle is rotated relative to the reference handle's anchor point is shown and discussed in greater detail with reference to FIG. 4.

At 760, the Bezier manipulation tool computes a new length of the target handle. As discussed herein, the new length of the target handle is the length of the target handle after cohesive manipulation by the Bezier manipulation tool. As discussed herein, the change in the length of the reference handle occurring as a result of the user-initiated manipulation of the reference handle cannot be directly applied to the group of Bezier handles as the target handles may not be the same length as the reference handle.

The Bezier manipulation tool computes a new length of the target handle by adjusting (or modifying) the initial length of the target handle by the calculated proportion of the change in the length of the reference handle occurring as a result of the user-initiated manipulation of the reference handle. The calculated proportion of the initial length of the target handle relative to the initial length of the reference handle is determined at 740. An example determination of the change in the length of the reference handle occurring as a result of the user-initiated manipulation of the reference handle is shown and discussed in greater detail with reference to FIG. 4.

For example, in a scenario where there are two handles selected: one of length 4 points and the other of length 50 points, and a designer (or user) moves the 50 points handle (the reference handle) radially by 4 points resulting in a new length of 54 points, then the change in the radial movement of the reference handle is 4 points. Applying this change in the radial movement (or delta-r) directly to the 4 points handle (the target handle) results in a length of 8 points (or double the initial value). Similarly, if designer (or user) reduces the length of 50 points handle (the reference handle) to 46 points, directly applying the delta-r to the 4 points (or target) handle results in a new length of 0 points. This change would essentially convert the associated anchor point from a smooth point to a corner one and, thus, result in an undesirable change to the curvature. Accordingly, instead of applying the delta-r directly, the Bezier manipulation tool calculates the percentage change in radial-length of the moved handle and this percentage change is applied to other (target) handles as well, maintaining their smoothness.

At 770, the Bezier manipulation tool determines new cartesian coordinates for the target handle. More specifically, the Bezier manipulation tool determines new cartesian coordinates for the target handle based on the new length of the target handle computed at step 760 and the new angle of the target handle computed at step 750.

At decision 780, the Bezier manipulation tool determines whether there are Bezier handles of the group of Bezier handles other than the reference handle that have not yet been processed. If there are unprocessed Bezier handles, the process continues at 710. For example, during the initial iteration, the Bezier manipulation tool accesses any target handle of the group of Bezier handles other than the reference handle for processing. In subsequent iterations, the Bezier manipulation tool accesses a next unprocessed target handle of the group of Bezier handles other than the reference handle. The process iterates until all of the Bezier handles of the group of Bezier handles other than the reference handle have been processed, e.g. new cartesian coordinates are determined for each target handle of the group of Bezier handles.

Lastly, at 790, the Bezier manipulation tool cohesively manipulates the group of Bezier handles. Indeed, the Bezier manipulation tool cohesively manipulates the selected group of Bezier handles in accordance with respective angular and radial length movements calculated for each of the Bezier handles concurrently with the manipulation of the reference Bezier handle by the designer (or user).

Example Algorithm

An example algorithm (or process) including pseudo code describing operations for cohesive manipulation of multiple Bezier handles is provided below for additional description. Indeed, the example algorithm begins by accesses information from the system or model:

```
std::map<AIArtHandle, std::vector<size_t>> artToSelectedAnchorsMap;
std::vector<AIArtHandle> selectedPaths = Details::BezierUtils::GetPathArtsFromContext(
);
for (const auto& path: selectedPaths)
{
   artToSelectedAnchorsMap [path]2 = Details::BezierUtils::GetSelectedPathAnchors
(path);
}.
```

The reference movement calculation process is then commenced. For example, the reference movement calculation process can be reference movement calculation process 400 of FIG. 4, although alternative configurations are possible. Here, the anchor (or reference Bezier) handle that the designer (or user) starts manipulating is referred to as the pivotAnchor (or pivot handle). The reference movement calculation process starts by calculating the angle by which the pivot handle is rotated (deltaPivotHandleAngle) and a difference in the pivot handle's length (deltaPivotHandleAngle) occurring as a result of the manipulation:

```
AIPathSegment pivotAnchor;
CHECK_AI_ERROR(sAIPath->GetPathSegments (pathArt, (ai::int16)pivotAnchorIndex, 1, &pivotAnchor), "Can't get
segments");
AnchorAndHandleLocations startingPivotAnchorLocations = {pivotAnchor.p, pivotAnchor.in, pivotAnchor.out};
PivotAnchorAndHandleDetails(const ArtObjectUUID& pathUUID, size_t pivotAnchorIndex, const AIPathSegment&
pivotAnchor, BezierComponentType componentType, ThyonRealPoint updatedLocation)
   : pivotAnchorIndex (pivotAnchorIndex)
   , pivotHandleType((componentType == BezierComponentType::kInHandle) ? Details::AnchorHandleType:: IN :
Details::AnchorHandleType::OUT)
   , pivotAnchorHandle((pivotHandleType == Details::AnchorHandleType:: IN) ? pivotAnchor.in :
pivotAnchor.out)
   {
       CHECK_AI_ERROR(sAIUUD->GetArtHandle(pathUUID, pathArt), "Failed to get art handle from path id");
       /* Computing the delta length and delta angle for pivot anchor
           diffLength = newLength - currentLength;
           diffAngle = newAngle - currentAngle;
           Both length and angle are calculated between the anchor location and the handle location of given
anchor.
       */
       AIReal currentLength = sAIRealMath->AIRealPointLength(&pivotAnchor.p, &pivotAnchorHandle);
       AIReal newLength = sAIRealMath->AIRealPointLength(&pivotAnchor. p, &updatedLocation);
       deltaPivotHandleLength = newLength - currentLength;
       AIReal currentAngle = sAIRealMath->AIRealPointAngle(&pivotAnchor.p, &pivotAnchorHandle);
       AIReal newAngle = sAIRealMath->AIRealPointAngle(&pivotAnchor.p, &updatedLocation);
       deltaPivotHandleAngle = newAngle – currentAngle;
       pivotHandleLength = currentLength;
   }
};
```

The reference movement calculation process also determines the pairing constraints applied on the Bezier handles:

```
BezierConstraintType constraint =
boost::get <AnchorAndHandleDetails>(data.componentDetails).bezierConstraint;
bool breakHandleAnglePairing = IRequireAnglePairing (constraint);
bool breakHandleLengthPairing = IRequireLengthPairing (constraint);
```

Next, the Bezier manipulation process for cohesively (or concurrently) manipulating multiple Bezier handles is commenced. For example, the Bezier manipulation process 700 of FIG. 7, although alternative configurations are possible. As shown below, the Bezier manipulation process loops around each of the selected anchor handles and perform the next steps for each handle:

```
for(const auto& selectedAnchorIndex : selectedAnchorsPerArt.second)
{
    if ( currentPathArt == pivotAnchorDetails.pathArt && selectedAnchorIndex ==
    pivotAnchorDetails.pivotAnchorIndex)
    continue;
    AIPathSegment selectedAnchor;
        CHECK_AI_ERRCR(sAIPath->GetPathSegments (currentPathArt, (ai::int16)selectedAnchorIndex, 1,
        &selectedAnchor), "Can't get path segments");
        Details::AnchorHandleType targetHandleType = (GetSelectionType(currentPathArt, selectedAnchorIn-
dex)
        == SelectionType:: kInHandle) ? Details::AnchorHandleType::IN : Details::AnchorHandleType::OUT ;
        auto updatedHandleLocation = ComputeHandlelocationInTandem(data, selectedAnchor, targetHandle-
Type,
        pivotAnchorDetails);
        Details::BezierUtils::UpdateHandlePositions(currentPathArt, selectedAnchorIndex, targetHandleType,
        breakHandleAnglePairing,
        breakHandleLengthPairing, updatedHandleLocation, false);
}
```

As shown above, a ComputeHandleLocationlnTandem function is applied to each target handle. The example algorithm including pseudo code describing operation of the ComputeHandleLocationlnTandem function is provided below.

1. Determine the current angle and the current length of the target handle (referred to as targetAnchorHandleAngle and targetAnchorHandleLength, respectively):

```
AIReal proportion = 1.0;
AIRealPoint targetAnchorHandle = (targetHandleType == Details::AnchorHandleType:: IN) ? targetAnchor. in :
targetAnchor.out;
AIReal targetAnchorHandleLength = sAIRealMath->AIRealPointLength(&targetAnchor.p, &targetAnchorHandle);
AIReal targetAnchorHandleAngle = sAIRealMath->AIRealPointAngle(&targetAnchor.p , &targetAnchorHandle);
```

2. To manipulate the length of the target handle proportionately, determine the proportion of the targetAnchorHandleLength and the pivotHandleLength:

```
if (targetAnchorHandleLength !=
0.0 && pivotAnchorDetails.pivotHandleLength != 0.0)
    proportion =
    targetAnchorHandleLength/pivotAnchorDetails.pivotHandleLength;
```

3. Update the new length of the target handle:

```
AIReal targetAnchorHandleNewLength = targetAnchorHandleLength +
pivotAnchorDetails.deltaPivotHandleLength proportion;
```

4. Update the new angle between the target anchor and its handle:

```
AIReal targetAnchorHandleNewAngle = targetAnchorHandleAngle +
pivotAnchorDetails.deltaPivotHandleAngle;
```

5. Determine the corresponding x and y coordinates of the handle

```
targetAnchorHandleNewLocation.h = targetAnchor.p.h + targetAnchorHandleNewLength
*
std::cos(targetAnchorHandleNewAngle);
targetAnchorHandleNewLocation.v = targetAnchor.p.v + targetAnchorHandleNewLength
*
std::sin(targetAnchorHandleNewAngle);
return targetAnchorHandleNewlocation;
```

FIGS. 8A-11B depict various diagrams illustrating example user interfaces for a vector drawing application before and after cohesive Bezier handle manipulation, according to some implementations. More specification, FIGS. 8-11 illustrates how the Bezier manipulation tool discussed herein facilitates increased workflow efficiency as cohesive Bezier handle manipulation reduces the hassle and the time required to sequentially (or individually) edit multiple Bezier handles and, thus, increases efficiency of the overall workflow. Additionally, improved Bezier manipulation precision is attainable via the discussed handle-movement paradigm which makes it easier to maintain same-level handle positions, parallelism, and angular symmetry amongst Bezier handles during manipulation—even in the absence of snapping amongst the Bezier handles.

Figure 8A:
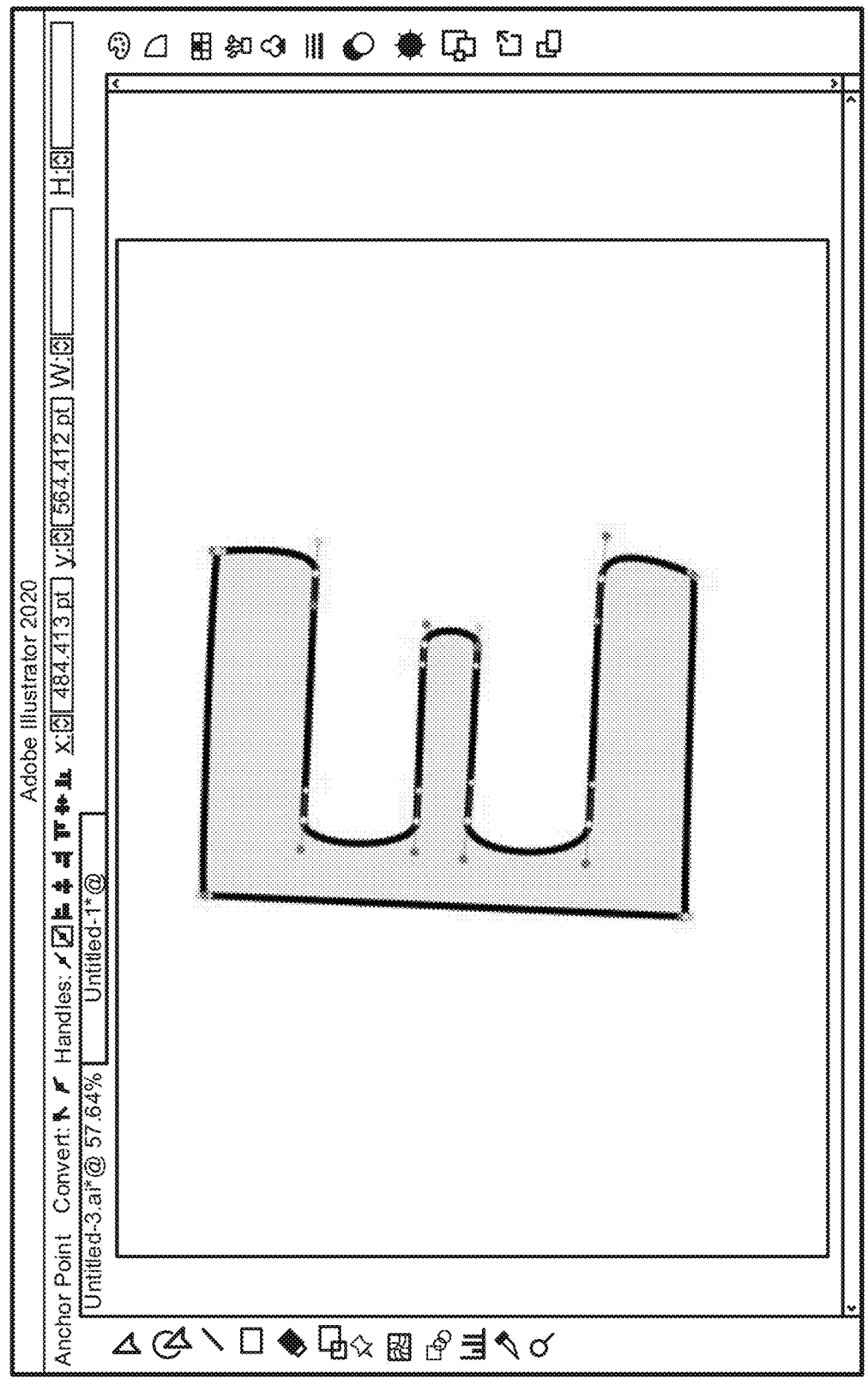
FIGS. 8A and 8B depict diagrams illustrating an example user interface for a vector drawing application before and after cohesive manipulation of multiple Bezier handles responsive to a user-initiated manipulation of one (a reference handle) of the multiple handles, according to some implementations.
Figure 8B:
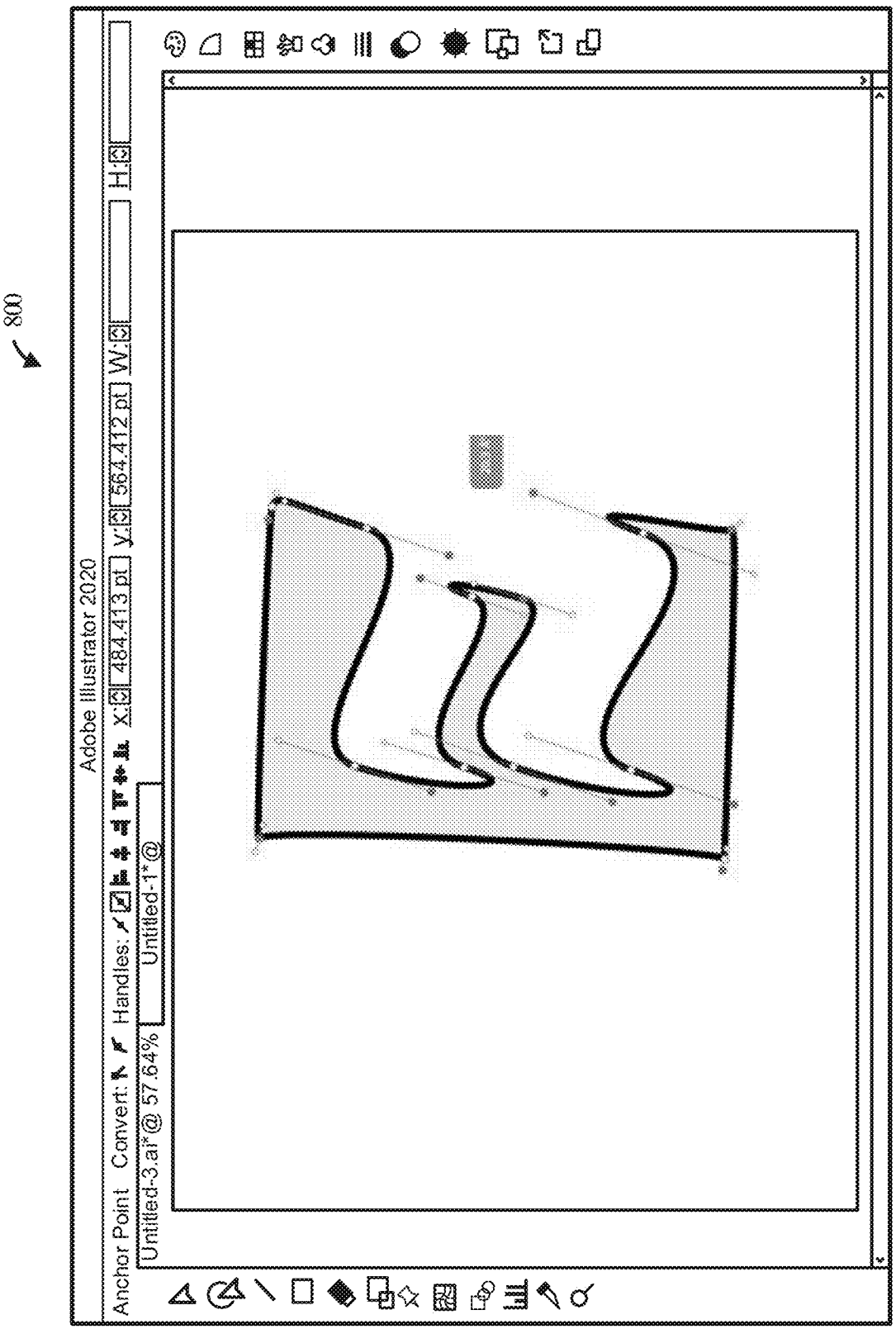

Referring first to FIGS. 8A and 8B, diagrams are shown illustrating an example user interface 800 for a vector drawing application before and after cohesive manipulation of multiple Bezier handles responsive to a user-initiated manipulation of one (a reference handle) of the multiple handles, according to some implementations. The vector drawing application can be vector drawing application 124 of FIG. 1 such as, for example, Adobe Illustrator®, although alternative configurations are possible.

More specifically, the example of FIG. 8A depicts a user interface 800 including a canvas having an alphabet letter 'E' with multiple parallel Bezier handles displayed thereon. FIG. 8B depicts an altered version of the alphabet letter 'E' on the canvas of the user interface 800 occurring as a result of a user-initiated manipulation of the alphabet letter 'E' of FIG. 8A. More specifically, the user-initiated manipulation is operable to uniformly alter the alphabet letter 'E' of FIG.

8A into a stylish version of the letter 'E' by cohesively manipulating each of the selected Bezier handles concurrently with a user-initiated manipulation of a reference Bezier handle.

Figure 9A:
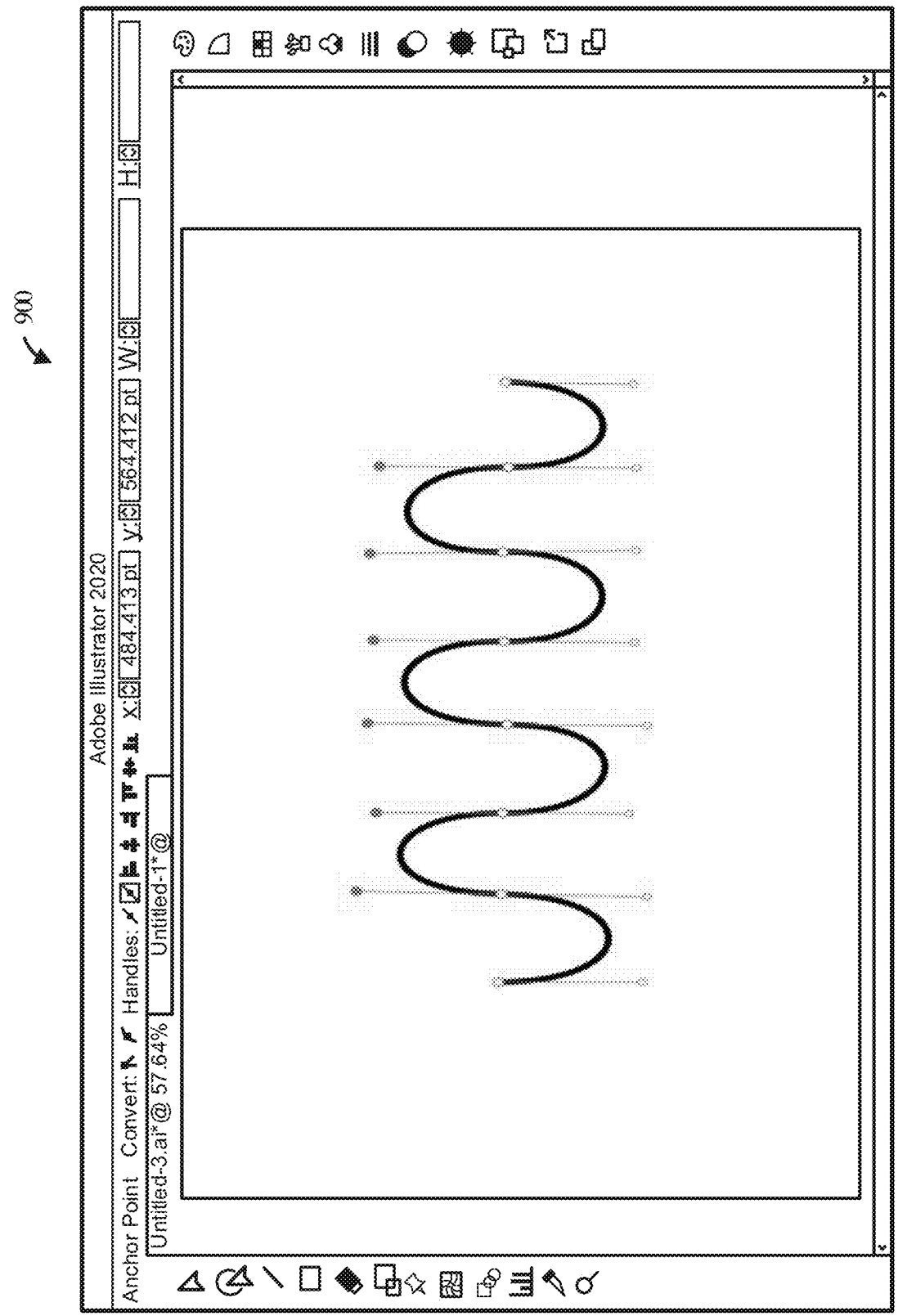
FIGS. 9A and 9B depict diagrams illustrating another example user interface for a vector drawing application before and after cohesive manipulation of multiple Bezier handles responsive to a user-initiated manipulation of one (a reference handle) of the multiple handles, according to some implementations.
Figure 9B:
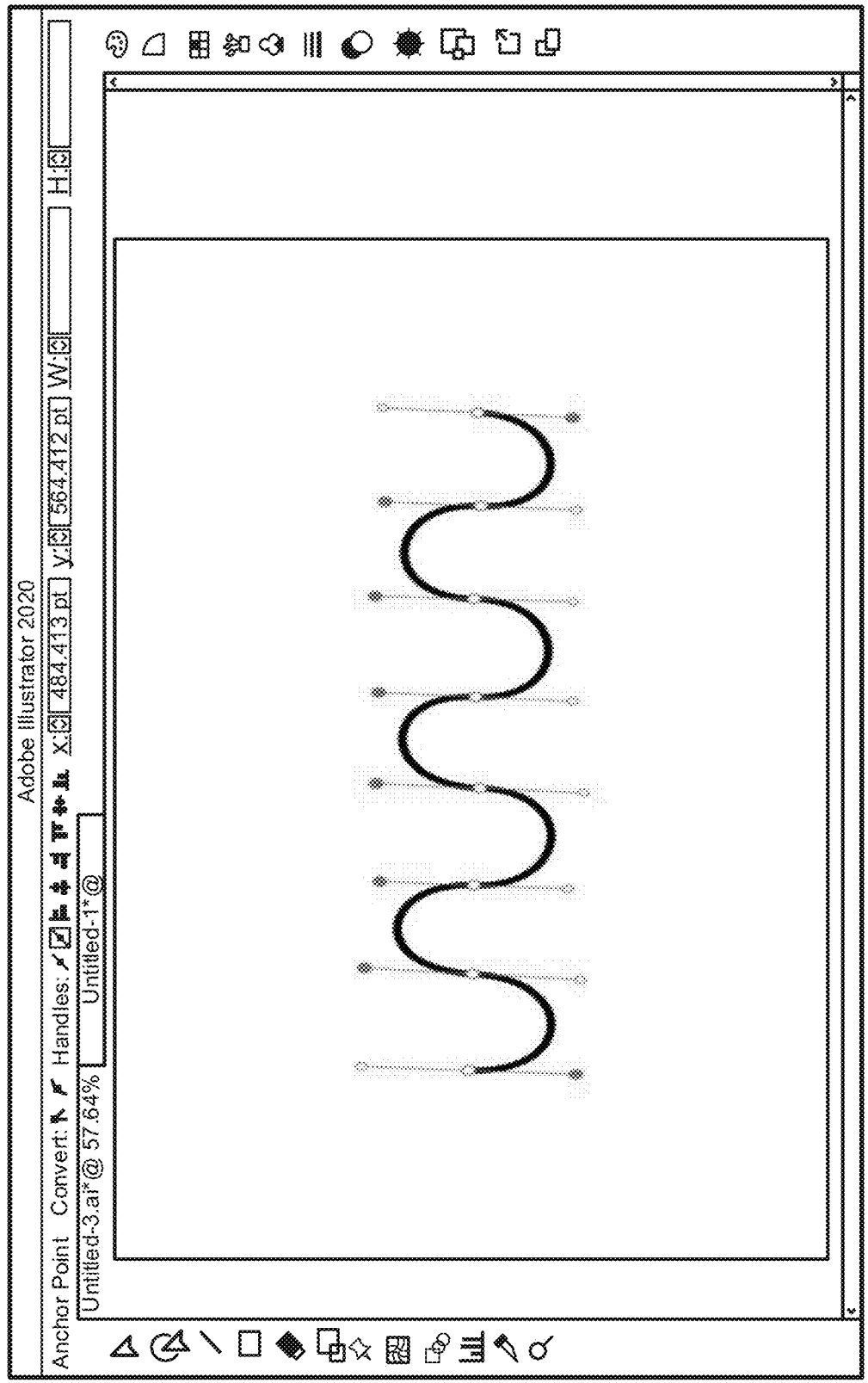

FIGS. 9A and 9B depict diagrams illustrating an example user interface 900 for a vector drawing application before and after cohesive manipulation of multiple Bezier handles responsive to a user-initiated manipulation of one (a reference handle) of the multiple handles, according to some implementations. The vector drawing application can be vector drawing application 124 of FIG. 1 such as, for example, Adobe Illustrator®, although alternative configurations are possible.

More specifically, the example of FIG. 9A depicts a user interface 900 including a canvas having a sinusoidal wave pattern with multiple parallel Bezier handles displayed thereon. FIG. 9B depicts an altered sinusoidal wave pattern on the canvas of the user interface 900 occurring as a result of a user-initiated manipulation of the sinusoidal wave pattern of FIG. 9A. More specifically, the user-initiated manipulation is operable to uniformly alter (decrease) amplitude of the sinusoidal wave pattern of FIG. 9A by cohesively manipulating each of the selected Bezier handles concurrently with a user-initiated manipulation of a reference Bezier handle.

Figure 10A:
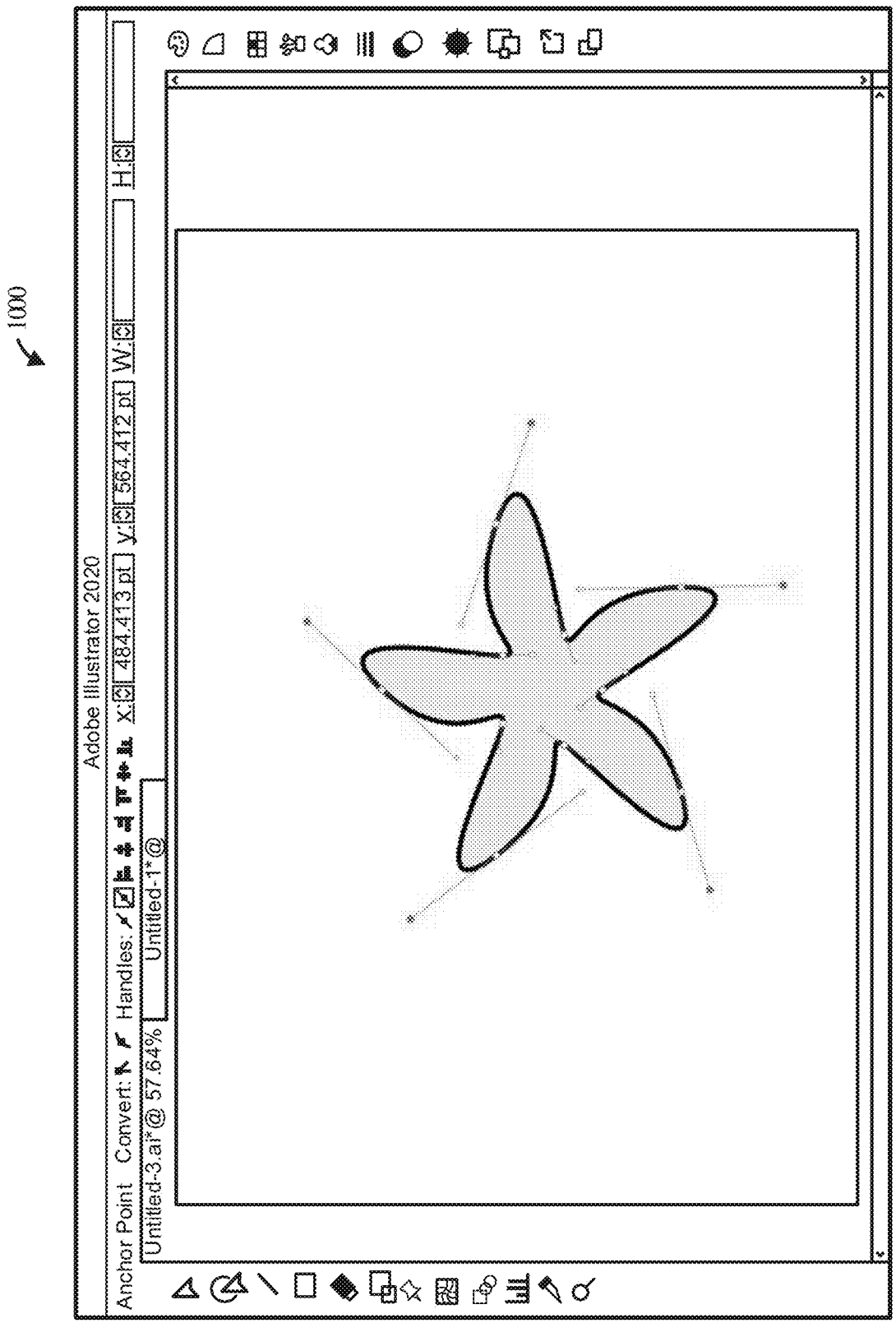
FIGS. 10A and 10B depict diagrams illustrating yet another example user interface for a vector drawing application before and after cohesive manipulation of multiple Bezier handles responsive to a user-initiated manipulation of one (a reference handle) of the multiple handles, according to some implementations.
Figure 10B:
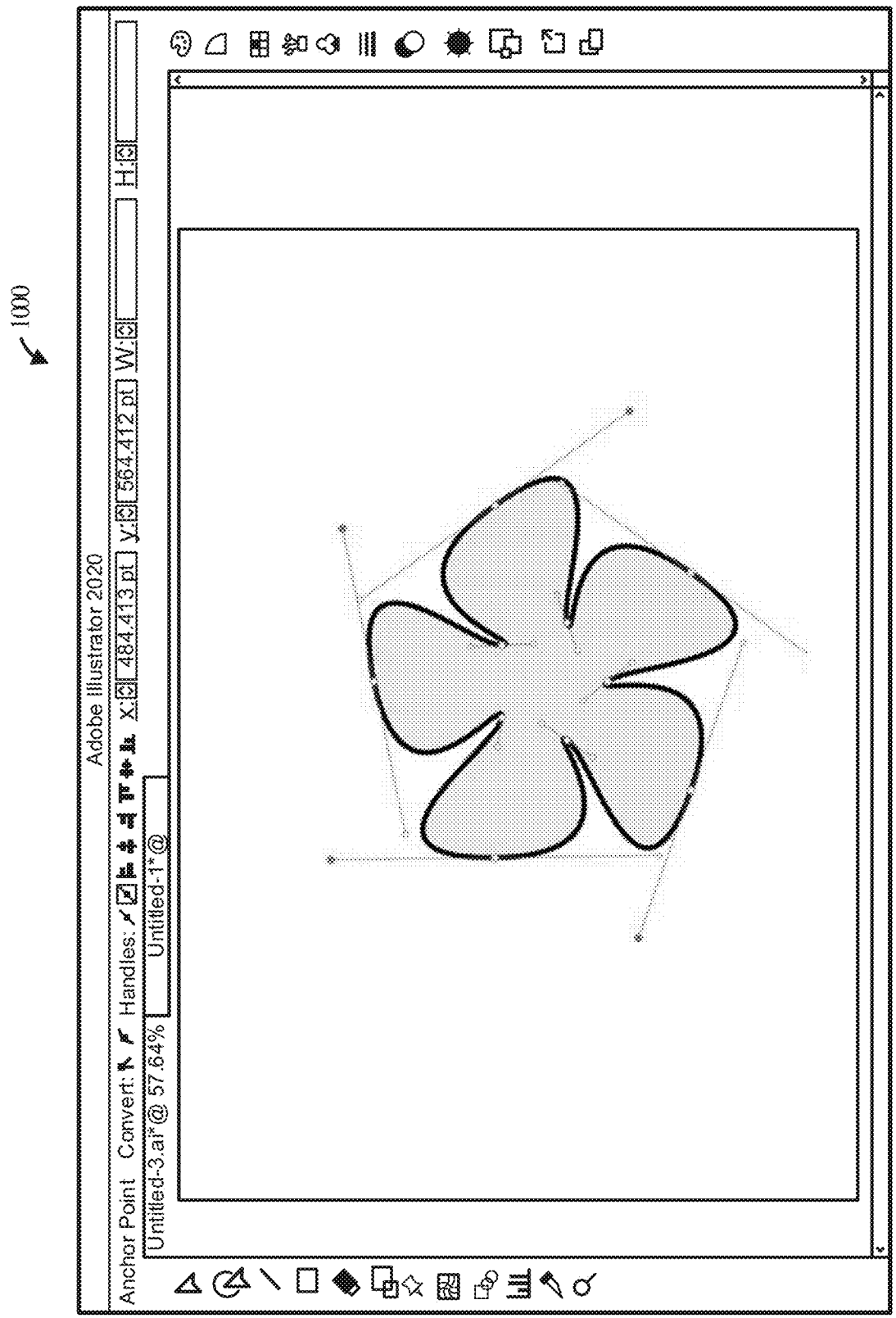

FIGS. 10A and 10B depict diagrams illustrating an example user interface 1000 for a vector drawing application before and after cohesive manipulation of multiple Bezier handles responsive to a user-initiated manipulation of one (a reference handle) of the multiple handles, according to some implementations. The vector drawing application can be vector drawing application 124 of FIG. 1 such as, for example, Adobe Illustrator®, although alternative configurations are possible.

More specifically, the example of FIG. 10A depicts a user interface 1000 including a canvas having a flower petal pattern with multiple Bezier handles displayed thereon. FIG. 10B depicts an altered flower petal pattern on the canvas of the user interface 1000 occurring as a result of a user-initiated manipulation of the flower petal pattern of FIG. 10A. More specifically, the user-initiated manipulation is operable to uniformly alter the flower petal pattern of FIG. 10A by cohesively manipulating each of the selected Bezier handles concurrently with a user-initiated manipulation of a reference Bezier handle.

Figure 11A:
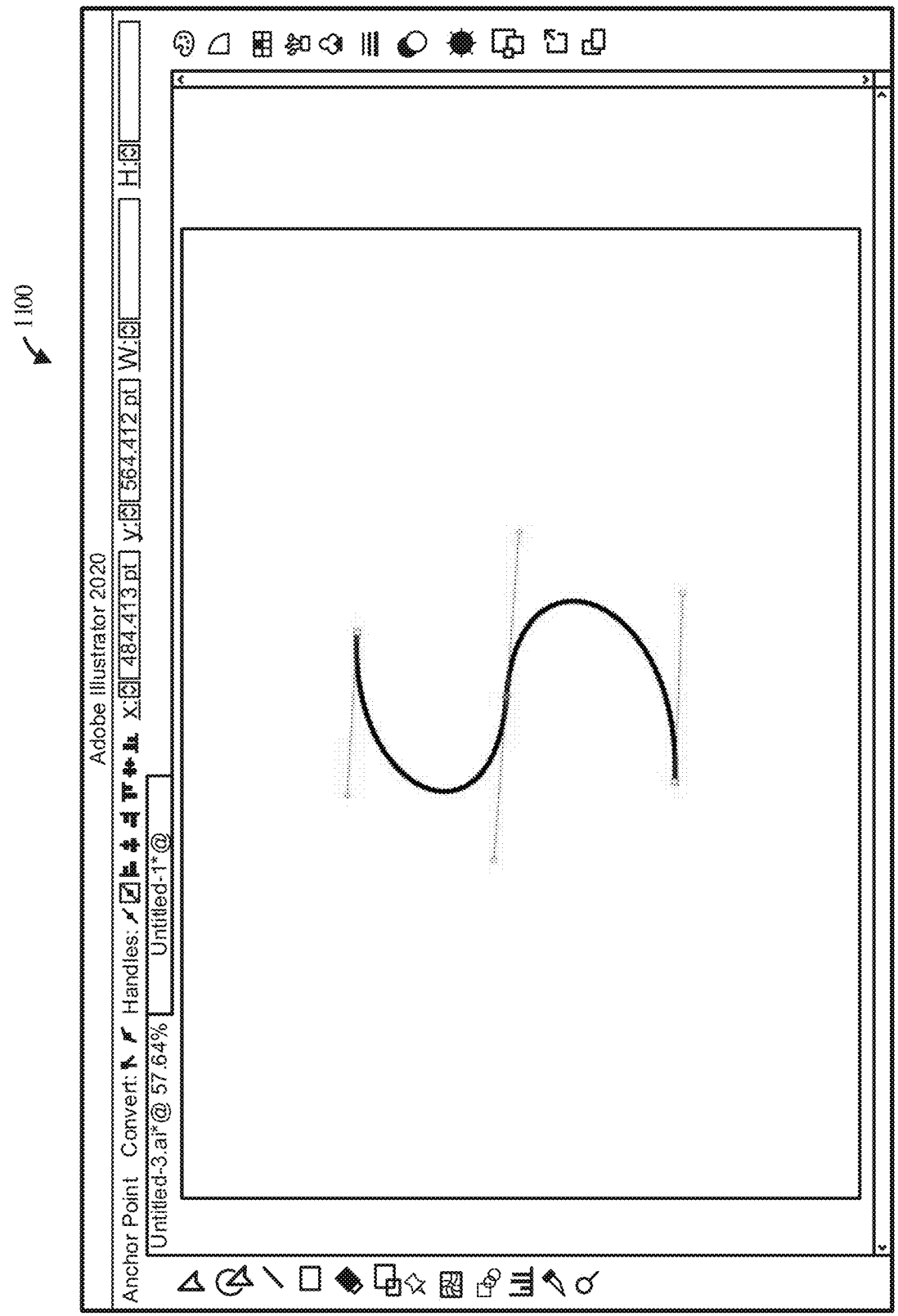
FIGS. 11A and 11B depict diagrams illustrating yet another example user interface for a vector drawing application before and after cohesive manipulation of multiple Bezier handles responsive to a user-initiated manipulation of one (a reference handle) of the multiple handles, according to some implementations.
Figure 11B:
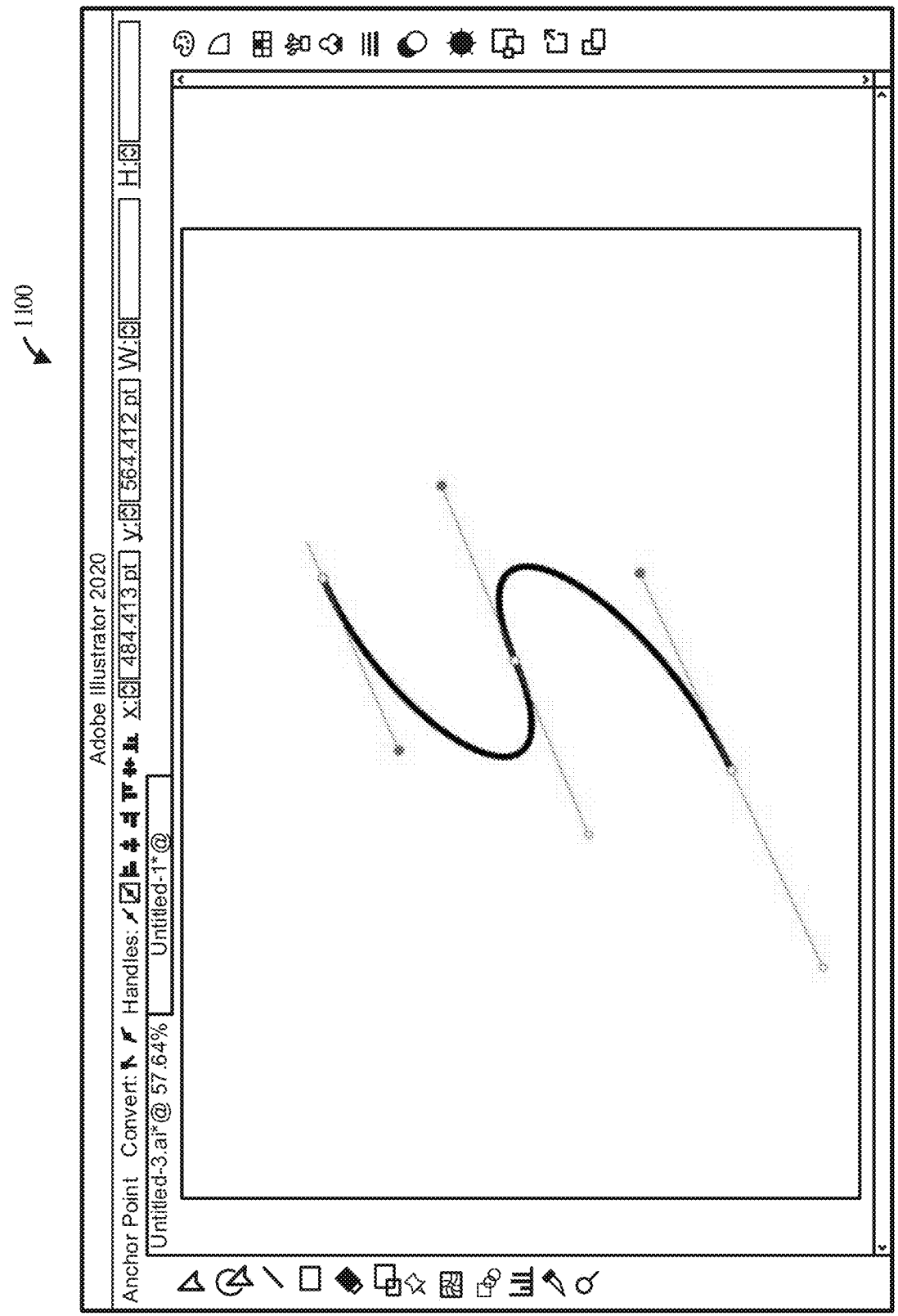

FIGS. 11A and 11B depict diagrams illustrating an example user interface 1100 for a vector drawing application before and after cohesive manipulation of multiple Bezier handles responsive to a user-initiated manipulation of one (a reference handle) of the multiple handles, according to some implementations. The vector drawing application can be vector drawing application 124 of FIG. 1 such as, for example, Adobe Illustrator®, although alternative configurations are possible.

More specifically, the example of FIG. 11A depicts a user interface 1100 including a canvas having an alphabet letter 'S' with multiple parallel Bezier handles displayed thereon. FIG. 11B depicts an altered version of the alphabet letter 'S' on the canvas of the user interface 1100 occurring as a result of a user-initiated manipulation of the alphabet letter 'S' of FIG. 11A. More specifically, the user-initiated manipulation is operable to uniformly alter the alphabet letter 'S' of FIG. 11A by cohesively manipulating each of the selected Bezier handles concurrently with a user-initiated manipulation of a reference Bezier handle.

FIG. 12 illustrates computing system 1201 that is representative of any system or collection of systems in which the various processes, programs, services, and scenarios disclosed herein may be implemented. Examples of computing system 1201 include, but are not limited to, server computers, cloud computing platforms, and data center equipment, as well as any other type of physical or virtual server machine, container, and any variation or combination thereof. Other examples include desktop computers, laptop computers, table computers, Internet of Things (IoT) devices, wearable devices, and any other physical or virtual combination or variation thereof.

Computing system 1201 may be implemented as a single apparatus, system, or device or may be implemented in a distributed manner as multiple apparatuses, systems, or devices. Computing system 1201 includes, but is not limited to, processing system 1202, storage system 1203, software 1205, communication interface system 1207, and user interface system 1209 (optional). Processing system 1202 is operatively coupled with storage system 1203, communication interface system 1207, and user interface system 1209.

Processing system 1202 loads and executes software 1205 from storage system 1203. Software 1205 includes and implements process 1206, which is representative of the processes discussed with respect to the preceding Figures. When executed by processing system 1202 to provide packet rerouting, software 1205 directs processing system 1202 to operate as described herein for at least the various processes, operational scenarios, and sequences discussed in the foregoing implementations. Computing system 1201 may optionally include additional devices, features, or functionality not discussed for purposes of brevity.

Continuing with the example of FIG. 12, processing system 1202 may comprise a micro-processor and other circuitry that retrieves and executes software 1205 from storage system 1203. Processing system 1202 may be implemented within a single processing device but may also be distributed across multiple processing devices or sub-systems that cooperate in executing program instructions. Examples of processing system 1202 include general purpose central processing units, graphical processing units, application specific processors, and logic devices, as well as any other type of processing device, combinations, or variations thereof.

Storage system 1203 may comprise any computer readable storage media readable by processing system 1202 and capable of storing software 1205. Storage system 1203 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1203 may also include computer readable communication media over which at least some of software 1205 may be communicated internally or externally. Storage system 1203 may be implemented as a single storage device but may also be implemented across multiple storage devices or sub-systems co-located or distributed relative to each other. Storage system 1203 may comprise additional elements, such as a controller, capable of communicating with processing system 1202 or possibly other systems.

Software 1205 (including learning process 1206) may be implemented in program instructions and among other functions may, when executed by processing system 1202, direct processing system 1202 to operate as described with respect to the various operational scenarios, sequences, and processes illustrated herein. For example, software 1205 may include program instructions for implementing a reinforcement learning process to learn an optimum scheduling policy as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1205 may include additional processes, programs, or components, such as operating system software, virtualization software, or other application software. Software 1205 may also comprise firmware or some other form of machine-readable processing instructions executable by processing system 1202.

In general, software 1205 may, when loaded into processing system 1202 and executed, transform a suitable apparatus, system, or device (of which computing system 1201 is representative) overall from a general-purpose computing system into a special-purpose computing system customized to provide motion learning. Indeed, encoding software 1205 on storage system 1203 may transform the physical structure of storage system 1203. The specific transformation of the physical structure may depend on various factors in different implementations of this description. Examples of such factors may include, but are not limited to, the technology used to implement the storage media of storage system 1203 and whether the computer-storage media are characterized as primary or secondary storage, as well as other factors.

For example, if the computer readable storage media are implemented as semiconductor-based memory, software 1205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1207 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method comprising:

detecting, by a manipulation detection module of a Bezier manipulation tool, a user-initiated manipulation of a reference handle of a selected group of Bezier handles within a vector drawing application, the selected group of Bezier handles comprising the reference handle and one or more other Bezier handles, each Bezier handle in the selected group of Bezier handles having a corresponding anchor point;

calculating, by a cohesive manipulation module of the Bezier manipulation tool relative to a reference anchor point associated with the reference handle, angular displacement of the reference handle relative to the reference anchor point and radial displacement of the reference handle relative to the reference anchor point; and manipulating, by the cohesive manipulation module concurrently with the user-initiated manipulation of the reference handle, each Bezier handle of the one or more other Bezier handles relative to the corresponding anchor point for the Bezier handle, in accordance with the angular displacement and the radial displacement of the reference handle.

2. The method of claim 1, wherein calculating the angular displacement of the reference handle occurring as a result of the user-initiated manipulation comprises:

identifying the reference anchor point associated with the reference handle; and calculating a change in an angle that the reference handle is rotated relative to the reference anchor point associated with the reference handle as a result of the user-initiated manipulation.

3. The method of claim 2, wherein calculating the change in the angle by which the reference handle is rotated relative to the reference anchor point comprises:
  determining an initial angle of the reference handle relative to the reference anchor point associated with the reference handle;
  determining a new angle that the reference handle is rotated as a result of the user-initiated manipulation; and
  computing the change in the angle that the reference handle is rotated relative to the reference anchor point associated with the reference handle based on a difference between the initial angle and the new angle.

4. The method of claim 1, wherein manipulating the one or more other Bezier handles comprises, for each Bezier handle of the one or more other Bezier handles:
  determining an initial angle of the Bezier handle relative to the corresponding anchor point of the Bezier handle, distinct form the reference anchor point of the reference handle; and
  computing a new angle for the Bezier handle relative to the corresponding anchor point of the Bezier handle, wherein the new angle comprises the initial angle of the Bezier handle rotated by the angular displacement.

5. The method of claim 4, wherein calculating the radial displacement of the reference handle occurring as a result of the user-initiated manipulation comprises:
  calculating a change in a length of the reference handle.

6. The method of claim 5, wherein calculating the change in the length of the reference handle comprises:
  determining an initial length of the reference handle;
  determining a new length of the reference handle occurring as a result of the user-initiated manipulation; and
  computing the change in the length of the reference handle,
  wherein the change in the length of the reference handle comprises a difference between the initial length of the reference handle and the new length of the reference handle.

7. The method of claim 6, wherein manipulating each Bezier handle of the one or more other Bezier handles:
  determining an initial length of the Bezier handle;
  computing a proportion of the initial length of the Bezier handle to the initial length of the reference handle;
  applying the computed proportion to the change in the length of the reference handle to determine a proportional change in the length of the reference handle; and
  computing a new length of the Bezier handle by manipulating the initial length of the Bezier handle by the proportional change in the length of the reference handle.

8. The method of claim 7, further comprising:
  determining, by a display module of the Bezier manipulation tool, new Cartesian coordinates for each Bezier handle of the one or more other Bezier handles based on the corresponding new length and new angle; and
  displaying, by the display module in a graphical user interface, an updated drawing path including the manipulated selected group of Bezier handles on a drawing canvas.

9. The method of claim 1, further comprising identifying the selected group of Bezier handles by:
  receiving, by a Bezier grouping module of the Bezier manipulation tool, a first user input identifying a drawing path on a drawing canvas;
  receiving, by the Bezier grouping module, a second user input identifying multiple Bezier handles; and
  grouping, by the Bezier grouping module, the multiple Bezier handles resulting in the selected group of Bezier handles.

10. An apparatus comprising:
  one or more hardware processors and memory configured to provide computer program instructions to the one or more hardware processors;
  a Bezier grouping module configured to use the one or more hardware processors to receive a selection identifying multiple Bezier handles and responsively group the multiple Bezier handles into a selected group of Bezier handles, the selected group of Bezier handles comprising a reference handle and one or more other Bezier handles, each Bezier handle in the selected group of Bezier handles having a corresponding anchor point;
  a manipulation detection module configured to use the one or more hardware processors to detect a user-initiated manipulation of the reference handle relative to the corresponding anchor point of the reference handle; and
  a cohesive manipulation module configured to use the one or more hardware processors to:
    calculate, responsive to detection of the user-initiated manipulation, a radial displacement of the reference handle and an angular displacement of the reference handle relative to the corresponding anchor point of the reference handle; and
    concurrent with the user-initiated manipulation of the reference handle, manipulate the one or more other Bezier handles of the selected group of Bezier handles by, for each handle of the one or more other Bezier handles:
      rotating an angle of the handle relative to the corresponding anchor point for the handle by an amount corresponding to the angular displacement of the reference handle; and
      modifying a length of the handle proportionally to the radial displacement of the reference handle.

11. The apparatus of claim 10, wherein to calculate the angular displacement the reference handle is rotated, the cohesive manipulation module is configured to:
  determine an initial angle of the reference handle relative to the corresponding anchor point of the reference handle;
  determine a new angle that the reference handle is rotated as a result of the user-initiated manipulation; and
  compute a difference between the initial angle and the new angle to determine the angular displacement that the reference handle is rotated relative to the corresponding anchor point of the reference handle.

12. The apparatus of claim 10, wherein to calculate the radial displacement of the reference handle, the cohesive manipulation module is configured to:
  determine an initial length of the reference handle;
  determine a new length of the reference handle occurring as a result of the user-initiated manipulation; and
  compute a change in the length of the reference handle,
  wherein the change in the length of the reference handle comprises a difference between the initial length of the reference handle and the new length of the reference handle.

13. The apparatus of claim 12, wherein to modify the length of the handle, the cohesive manipulation module is configured to:

determine the initial length of the handle;
compute a proportion of the initial length of the handle relative to the initial length of the reference handle;
apply the computed proportion to the change in the length of the reference handle to determine a proportional change in the length of the reference handle; and
manipulate the initial length of the handle by the proportional change in the length of the reference handle resulting in a new length of the handle.

14. The apparatus of claim 13, further comprising:
a display module configured to determine new Cartesian coordinates for each handle of the selected group of Bezier handles based on the corresponding new lengths and angles.

15. The apparatus of claim 10, further comprising:
a display module configured to graphically present an updated drawing path including the manipulated group of selected Bezier handles on a drawing canvas in a graphical user interface.

16. A computing system comprising:
detection means for detecting a user-initiated manipulation of a reference handle of a selected group of Bezier handles, the selected group of Bezier handles comprising the reference handle and one or more other Bezier handles, each Bezier handle in the selected group of Bezier handles having a corresponding anchor point;
processing means for calculating, relative to the corresponding anchor point of the reference handle, angular displacement and radial displacement of the reference handle occurring as a result of the user-initiated manipulation; and
manipulation means for cohesively manipulating, concurrent with the user-initiated manipulation of the reference handle, each Bezier handle of the one or more other Bezier handles of the selected group of Bezier handles relative to the corresponding anchor point for the Bezier handle in accordance with the angular displacement and the radial displacement of the reference handle.

17. The computing system of claim 16, wherein to calculate the angular displacement of the reference handle occurring as a result of the user-initiated manipulation, the processing means are further configured to:
identify the corresponding anchor point of the reference handle; and
calculate a change in an angle that the reference handle is rotated relative to the corresponding anchor point of the reference handle as a result of the user-initiated manipulation by:
determining an initial angle of the reference handle relative to the corresponding anchor point of the reference handle;
determining a new angle that the reference handle is rotated as a result of the user-initiated manipulation; and
computing the change in the angle that the reference handle is rotated relative to the corresponding anchor point of the reference handle based on a difference between the initial angle and the new angle.

18. The computing system of claim 17, wherein to manipulate the one or more other Bezier handles, the manipulation means are configured to, for each handle of the one or more other Bezier handles:
determine an initial angle of the handle relative to a corresponding anchor point associated with the handle; and
compute a new angle for the handle relative to the corresponding anchor point,
wherein the new angle comprises the initial angle of the handle rotated by the change in the angle that the reference handle is rotated relative to the corresponding anchor point of the reference handle.

19. The computing system of claim 16, wherein to calculate the radial displacement of the reference handle occurring as a result of the user-initiated manipulation, the processing means are further configured to:
calculate a change in a length of the reference handle by:
determining an initial length of the reference handle;
determining a new length of the reference handle occurring as a result of the user-initiated manipulation; and
computing the change in the length of the reference handle,
wherein the change in the length of the reference handle comprises a difference between the initial length of the reference handle and the new length of the reference handle.

20. The computing system of claim 19, wherein to manipulate the one or more other Bezier handles, the manipulation means are configured to, for each handle of the one or more other Bezier handles:
determine an initial length of the handle;
compute a proportion of the initial length of the handle to the initial length of the reference handle;
apply the computed proportion to the change in the length of the reference handle to determine a proportional change in the length of the reference handle; and
computing a new length of the handle by manipulating the initial length of the handle by the proportional change in the length of the reference handle.

* * * * *

UNITED STATES PATENT AND TRADEMARK OFFICE
CERTIFICATE OF CORRECTION

| | |
|---|---|
| PATENT NO. | : 11,182,937 B1 |
| APPLICATION NO. | : 16/923402 |
| DATED | : November 23, 2021 |
| INVENTOR(S) | : Vivek Agrawal et al. |

It is certified that error appears in the above-identified patent and that said Letters Patent is hereby corrected as shown below:

In the Drawings

Sheet 6, Fig. 4, block 410, Line 5, delete "REFENCE" and insert -- REFERENCE --, therefor.

Sheet 6, Fig. 4, block 420, Line 6, delete "REFENCE" and insert -- REFERENCE --, therefor.

Sheet 9, Fig. 7, block 720, Line 1, after "ANGLE" insert -- THAT --.

Sheet 9, Fig. 7, block 750, Line 1, after "ANGLE" insert -- THAT --.

In the Specification

In Column 17, Line 58, after "handle" insert -- : --.

In the Claims

In Column 23, Line 19, Claim 4, delete "form" and insert -- from --, therefor.

Signed and Sealed this
Twelfth Day of July, 2022

Katherine Kelly Vidal
Director of the United States Patent and Trademark Office